US006504166B2

(12) United States Patent
Imai

(10) Patent No.: US 6,504,166 B2
(45) Date of Patent: Jan. 7, 2003

(54) METHOD AND APPARATUS FOR RECORDING IMAGE IN RECORDING MEDIUM USING PHOTOCONDUCTOR WITH REDUCED DARK LATENT IMAGE, AND READING IMAGE FROM PHOTOCONDUCTOR WITH REDUCED DARK CURRENT

(75) Inventor: Shinji Imai, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 3 days.

(21) Appl. No.: 09/897,494

(22) Filed: Jul. 3, 2001

(65) Prior Publication Data

US 2002/0000528 A1 Jan. 3, 2002

(30) Foreign Application Priority Data

Jul. 3, 2000 (JP) ....................................... 2000-200838

(51) Int. Cl.[7] ................................................ G01T 1/16
(52) U.S. Cl. .......................... 250/580; 250/591; 378/28
(58) Field of Search ................................ 250/580, 591, 250/370.08, 370.09, 370.14; 378/28, 31

(56) References Cited

U.S. PATENT DOCUMENTS

| | | | | |
|---|---|---|---|---|
| 4,535,468 A | | 8/1985 | Kempter | 378/31 |
| 5,648,660 A | | 7/1997 | Lee et al. | 250/370.09 |
| 5,661,309 A | | 8/1997 | Jeromin et al. | 250/580 |
| 5,994,713 A | * | 11/1999 | Becker et al. | 250/591 |
| 6,268,614 B1 | | 7/2001 | Imai | 250/591 |

FOREIGN PATENT DOCUMENTS

| | | | |
|---|---|---|---|
| EP | 0 898 421 A2 | 2/1999 | H04N/5/30 |
| EP | 0 989 730 A2 | 3/2000 | H04N/1/00 |
| EP | 1 041 400 A2 | 10/2000 | G01T/1/24 |
| EP | 1 041 401 A2 | 10/2000 | G01T/1/29 |
| JP | 9-206293 | 8/1997 | A61B/6/00 |
| JP | 2000-105297 | 4/2000 | G21K/4/00 |
| JP | 2000-162726 | 6/2000 | G03B/42/02 |
| JP | 2000-284056 | 10/2000 | G01T/1/24 |
| JP | 2000-284057 | 10/2000 | G01T/1/24 |

OTHER PUBLICATIONS

Medical Physics, vol. 16, No. 1, Jan./Feb. 1989, pp. 105–109.

Feb. 1998, SPIE vol. 3336, Feb. 1998, pp. 494.

Journal of Non–Crystalline Solids, vol. 227–230 (1998), pp. 1359–1362.

* cited by examiner

*Primary Examiner*—Constantine Hannaher
*Assistant Examiner*—Timothy Moran
(74) *Attorney, Agent, or Firm*—Sughrue Mion, PLLC

(57) ABSTRACT

In an apparatus for recording image information in an image recording medium including a photoconductor, a preliminary electric field is applied to the photoconductor before application of a recording electric field, which is applied to the photoconductor for recording the image information, and the preliminary electric field is stronger than the recording electric field. In addition, in an apparatus for reading image information carried by an electromagnetic wave by using a photoconductor, a preliminary electric field is applied to the photoconductor before application of a reading electric field, which is applied to the photoconductor for reading the image information, and the preliminary electric field is stronger than the reading electric field.

15 Claims, 13 Drawing Sheets

METHOD AND APPARATUS FOR RECORDING IMAGE IN RECORDING MEDIUM USING PHOTOCONDUCTOR WITH REDUCED DARK LATENT IMAGE, AND READING IMAGE FROM PHOTOCONDUCTOR WITH REDUCED DARK CURRENT

CROSS-REFERENCE TO RELATED APPLICATIONS

The subject matters disclosed in this specification are related to the subject matters disclosed in the following copending, commonly-assigned U.S. patent applications:

(1) U.S. Ser. No. 09/792,035 filed by Shinji Imai (the inventor of the present application) and Hiroaki Yasuda on Feb. 26, 2001 and entitled "METHOD AND APPARATUS FOR READING IMAGE INFORMATION BY USE OF STIMULABLE PHOSPHOR, AND SOLID-STATE IMAGE DETECTOR," corresponding to Japanese Patent Application No. 2000-50201;

(2) U.S. Ser. No. 09/534,204 filed by Shinji Imai (the inventor of the present application) and Hiroaki Yasuda on Mar. 24, 2000 and entitled "IMAGE READ-OUT METHOD AND SYSTEM, SOLID IMAGE SENSOR, AND IMAGE DETECTING SHEET," corresponding to Japanese Patent Application Nos. 2000-50202, 2000-50203, 2000-50204, 2000-50205, and 11(1999)-79984;

(3) U.S. Ser. No. 09/136,739, now U.S. Pat. No. 6,268,614, filed by Shinji Imai (the inventor of the present application) on Aug. 19, 1998 and entitled "ELECTROSTATIC RECORDING MEMBER, ELECTROSTATIC LATENT IMAGE RECORDING APPARATUS, AND ELECTROSTATIC LATENT IMAGE READ-OUT APPARATUS," corresponding to Japanese Patent Application No. 10(1998)-232824, which is disclosed in Japanese Unexamined Patent Publication No. 2000-105297;

(4) U.S. Ser. No. 09/539,412 filed by Masaharu Ogawa, Shinji Imai (the inventor of the present application), and Toshitaka Agano on Mar. 30, 2000 and entitled "RADIATION SOLID-STATE DETECTORS, AND RADIATION IMAGE RECORD-READING METHOD AND DEVICE USING THE SAME," corresponding to Japanese Patent Application No. 11(1999)-87922, which is disclosed in Japanese Unexamined Patent Publication No. 2000-284056;

(5) U.S. Ser. No. 09/538,479 filed by Shinji Imai (the inventor of the present application) on Sep. 24, 1999 and entitled "SOLID-STATE RADIOGRAPHIC IMAGE DETECTORS," corresponding to Japanese Patent Application No. 11(1999)-89553, which is disclosed in Japanese Unexamined Patent Publication No. 2000-284057; and (6) U.S. Ser. No. 09/404,371, now U.S. Pat. No. 6,376,857, filed by Shinji Imai (the inventor of the present application) on Sep. 24, 1999 and entitled "READ-OUT APPARATUS FOR AN IMAGE DETECTOR," corresponding to Japanese Patent Application Nos. 10(1998)-271374 and 11(1999)-242876, the latter of which is disclosed in Japanese Unexamined Patent Publication No. 2000-162726;

The contents of the above copending, commonly-assigned U.S. Patent Applications (1) to (6) and the corresponding Japanese Patent Applications are incorporated in this specification by reference.

BACKGROUND OF THE INVENTION

1. Field of the Invention

The present invention relates to a method and apparatus for recording and/or reading image information by using a photoconductor which generates electric charges when exposed to an electromagnetic wave such as a radiation and light.

2. Description of the Related Art

Conventionally, a number of systems are proposed for recording and/or reading image information by employing a photoconductor realized by an organic or inorganic amorphous semiconductor material, and utilizing the property of exhibiting electric conductivity (i.e., generating pairs of electric charges in the photoconductor) when the photoconductor is exposed to electromagnetic waves. For example, the above systems are disclosed in the coassigned U.S. Ser. No. 09/792,035 corresponding to Japanese Patent Application No. 2000-50201, the coassigned U.S. Ser. No. 09/534,204 corresponding to Japanese Patent Application Nos. 2000-50202, 2000-50203, 2000-50204, 2000-50205, and 11(1999)-79984, the coassigned U.S. Ser. No. 09/136,739, now U.S. Pat. No. 6,268,614, corresponding to Japanese Unexamined Patent Publication No. 2000-105297, the coassigned U.S. Ser. No. 09/539,412 corresponding to Japanese Unexamined Patent Publication No. 2000-284056, the coassigned U.S. Ser. No. 09/538,479 corresponding Japanese Unexamined Patent Publication No. 2000-284057, the U.S. Pat. Nos. 5,648,660, 5,661,309, and 4,535,468, Japanese Unexamined Patent Publication No. 9(1997)-206293, and Medical Physics, Vol. 16, No.1, January/February 1989, pp.105–109.

The recording systems for recording image information have a laminated structure in which a photoconductor is sandwiched between two electrodes, and a charge storing portion is provided for storing charges generated in the photoconductor. When the photoconductor is exposed to electromagnetic waves (or recording light) carrying image information while applying a voltage between the two electrodes so as to produce an electric field in the photoconductor, pairs of charges are generated in the photoconductor, and latent-image charges in the generated pairs are stored in the charge storing portion. Thus, the image information is recorded as a latent image.

On the other hand, in the reading systems for reading information, charges are generated in a photoconductor when the photoconductor is exposed to electromagnetic waves carrying image information while applying an electric field to the photoconductor, and the image information is read by detecting the generated charges, i.e., detecting currents produced by the generated charges. The electromagnetic wave are, for example, X rays which have penetrated through an object, or accelerated phosphorescence light emitted from a stimulable phosphor sheet used as an image recording medium.

However, in the case where an amorphous material such as a-Se (amorphous selenium) is used in each of the above photoconductors, charges are directly injected from the electrodes located on both sides of the photoconductor into the photoconductor from the beginning of application of a voltage (which is generally high) between the electrodes until short-circuiting of the electrodes. A portion of the injected charges is trapped as space charges in the photoconductor or at the interfaces between the photoconductor and the electrodes, and the other portion of the injected charges is not trapped, and output from the photoconductor as a leakage current. Thus, a dark current flows in the photoconductor.

In the recording systems, unnecessary charges caused by the dark current are accumulated in the charge storing portion. Therefore, a dark latent image, which is produced by the unnecessary charges, and does not carry true image information, is superimposed on a true latent image corresponding to the true image information. Thus, when the charges stored in the charge storing portion is read after the recording operation, the dark latent image produced during the recording operation appears as dark latent image noise in a regenerated image.

On the other hand, in the reading systems, the dark current flowing in the photoconductor is superimposed on a true current component carrying the true image information. Therefore, the dark current flowing in the photoconductor during the reading operation also appears as dark latent image noise in a regenerated image.

In particular, since the quantum efficiency of the photoconductor with respect to X rays is low, the amount of charges generated by direct exposure to X rays which have penetrated through an object is very small. In addition, since the accelerated phosphorescence light is very weak, the amount of charges generated by exposure to the accelerated phosphorescence light is also very small. Therefore, in these cases, when the dark current is large, the S/N ratio decreases seriously.

If the dark current can be reduced, the influence of the dark latent image noise is also reduced, and the decrease in the S/N ratio can be prevented. However, in order to reduce the dark current, the dark resistance must be increased. For example, in the case where a detector which includes an a-Se photoconductor having a thickness of 500 micrometers is exposed to a 10 mR dose of radiation having energy of 80 keV for one second, the magnitude of the dark current must be reduced to 10 pA/cm$^2$ or less in order to reduce the influence of the dark latent image to an ignorable degree. In order to achieve such reduction of the dark current, the dark resistance must be increased to a very great value as much as $10^{15}$ Ω.cm or more when an electric field of 10 V/μm is applied to the photoconductor.

Although a-Se is usable under the dark resistance of $10^{15}$ Ω.cm in the electric field of 10 V/μm, the dark resistance of $10^{15}$ Ω.cm is insufficient to achieve a satisfactory S/N ratio in the regenerated image in the case where recording or reading is performed by direct exposure of the photoconductor to X rays or exposure of the photoconductor to accelerated phosphorescence light. Therefore, a higher dark resistance is required. Conventionally, increase of the dark resistance by appropriate selection of a material for the electrodes is proposed, for example, by R. E. Johanson et al. ("Metallic Electrical Contacts to Stabilized Amorphous Selenium for Use in X-ray Image Detectors," Journal of Non-Crystalline Solids, Vol. 227–230 (1998) pp. 1359–1362). In addition, increase of the dark resistance by arrangement of an appropriate blocking layer between the photoconductor and the electrodes (which is made of, for example, a-Se) is proposed, for example, by B. Polischuk et al., ("Selenium Direct Converter Structure for Static and Dynamic X-ray Detection in Medical Imaging Application," Proceedings of the SPIE Conference on Physics of Medical Imaging, February 1998, SPIE Vol. 3336, Paper #: 3336–51).

Conventionally, the strength of the electric field which is most often applied to the photoconductor is 10 V/μm. However, when the strength of the electric field of the photoconductor is increased beyond 10 V/μm in order to increase the quantum efficiency and sensitivity by causing the avalanche amplification, the dark current often increases more than the true signal component, and therefore the SIN ratio decreases.

On the other hand, the dark current has a characteristic that a very large, momentary charging current first flows at the beginning of the application of an electric field. Thereafter, a transient current (absorption current) flows, where the absorption current gradually decreases with time to a constant leakage current. In other words, the dark resistance at the beginning of the application of the electric field is smaller than the dark resistance in a high resistance state, in which the stabilized low leakage current flows. The higher the application voltage is, the more pronounced the above phenomenon is. As disclosed in the R. E. Johanson reference, it takes a relatively long time to reach a stable, high resistance state after voltage application. For example, it takes usually one to ten minutes, and in some instances about one hour. Further, a long start-up time is required to use the photoconductor in the high resistance state.

SUMMARY OF THE INVENTION

An object of the present invention is to provide a method and an apparatus for recording image information, which can reduce a dark current flowing during application of an electric field for recording.

Another object of the present invention is to provide a method and an apparatus for reading image information, which can reduce a dark current flowing during application of an electric field for reading.

Still another object of the present invention is to provide a method and an apparatus for recording image information, which can reduce a time required to reach a stable, high resistance state in which the dark current level is low.

A further object of the present invention is to provide a method and an apparatus for reading image information, which can reduce a time required to reach a stable, high resistance state in which the dark current level is low.

(1) According to the first aspect of the present invention, there is provided a method for recording image information in an image recording medium including a photoconductor which is made of an amorphous material, and generates latent-image charges when the photoconductor is exposed to an electromagnetic wave during application of a first electric field to the photoconductor, and a charge storing portion which stores the latent-image charges so as to form a latent image. The method comprises the steps of: (a) applying to the photoconductor a second electric field stronger than the first electric field; (b) stopping application of the second electric field to the photoconductor; and (c) recording in the image recording medium the image information carried by the electromagnetic wave by exposing the photoconductor to the electromagnetic wave while applying the first electric field to the photoconductor, so that the latent-image charges generated in the photoconductor corresponding to the image information are stored in the charge storing portion.

When the application of the second electric is stopped in the step (b), the electric field applied to the photoconductor is reduced to the strength of the first electric field or less. For example, the electric field applied to the photoconductor may be reduced to the strength of the first electric field, or to zero.

Preferably, the method according to the first aspect of the present invention also has one or any possible combination of the following additional features (i) to (iii).

(i) The step (c) may be performed within about thirty seconds of the operation of the step (b).

(ii) The method according to the first aspect of the present invention may further comprise the step of (d) applying a third electric field to the photoconductor before performing the step (a), where the third electric field has an identical strength to the first electric field.

In addition, it is further preferable that the second electric field is applied after a dark current which flows in response to the application of the third electric field becomes stable (i.e., after the photoconductor enters a high resistance state).

(iii) The method according to the first aspect of the present invention may further comprise the step of (e) reading out charges corresponding to a dark latent image from the image recording medium before performing the step (c). The dark latent image means a latent image caused by unnecessary charges which does not carry image information to be recorded. Generally, the dark latent image includes charges left by a previous reading operation, and a component caused by a current generated in response to application of an electric field to the photoconductor.

Further, it is further preferable that the step (e) is performed after the step (b).

(2) According to the second aspect of the present invention, there is provided an apparatus for recording image information carried by an electromagnetic wave as a latent image in an image recording medium including a photoconductor which is made of an amorphous material, and generates latent-image charges when the photoconductor is exposed to the electromagnetic wave during application of a first electric field to the photoconductor, and a charge storing portion which stores the latent-image charges so as to form the latent image; the apparatus comprising: an electric-field applying unit which applies an electric field to the photoconductor; and a control unit which controls the electric-field applying unit so as to first apply a second electric field to the photoconductor for a certain duration, and thereafter apply the first electric field to the photoconductor for recording the image information, where the second electric field is stronger than the first electric field.

Preferably, the apparatus according to the second aspect of the present invention also has one or any possible combination of the following additional features (iv) and (v).

(iv) The control unit may control the electric-field applying unit so as to apply a third electric field to the photoconductor before application of the second electric field to the photoconductor, where the third electric field has an identical strength to the first electric field.

(v) The apparatus according to the second aspect of the present invention may further comprise a reading unit which reads the image information by detecting charges corresponding to the latent-image charges and being stored in the charge storing portion, and the control unit may control the electric-field applying unit and the reading unit so that the reading unit reads out charges corresponding to a dark latent image from the image recording medium, before recording the image information.

(3) According to the third aspect of the present invention, there is provided a method comprising the steps of: (a) applying a first electric field to a photoconductor made of an amorphous material; (b) stopping application of the first electric field to the photoconductor; and (c) reading image information carried by an electromagnetic wave by exposing the photoconductor to the electromagnetic wave while applying a second electric field to the photoconductor, and detecting charges which are generated in the photoconductor when the photoconductor is exposed to the electromagnetic wave during application of the second electric field to the photoconductor, where the first electric field is stronger than the second electric field.

When the application of the first electric is stopped in the step (b), the electric field applied to the photoconductor is reduced to the strength of the second electric field or less. For example, the electric field applied to the photoconductor may be reduced to the strength of the second electric field, or to zero.

Preferably, the method according to the third aspect of the present invention also has one or any possible combination of the following additional features (vi) to (viii) .

(vi) The step (c) may be performed within about thirty seconds of the operation of the step (b).

(vii) The method according to the third aspect of the present invention may further comprise the step of (d) applying a third electric field to the photoconductor before performing the step (a), where the third electric field has an identical strength to the second electric field. In this case, it is further preferable that the third electric field is applied after a dark current which flows in response to the application of the third electric field becomes stable (i.e., after the photoconductor enters a high resistance state).

(viii) The method according to the third aspect of the present invention may further comprise the step of (e) reading out a portion of a dark current increased by application of the first (preliminary) electric field, before performing the step (c).

(4) According to the fourth aspect of the present invention, there is provided an apparatus comprising: a photoconductor which is made of an amorphous material, and generates charges when exposed to an electromagnetic wave during application of a first electric field to the photoconductor; an electric-field applying unit which applies an electric field to the photoconductor; a reading unit which reads image information carried by the electromagnetic wave by detecting the charges generated by the photoconductor during the application of the first electric field to the photoconductor; and a control unit which controls the electric-field applying unit so as to first apply a second electric field to the photoconductor for a certain duration, and thereafter apply the first electric field to the photoconductor for reading the image information, where the second electric field is stronger than the first electric field.

Preferably, the apparatus according to the fourth aspect of the present invention also has one or any possible combination of the following additional features (ix) to (xi).

(ix) The control unit may control the control unit and the reading unit so that the reading unit reads the image information within about thirty seconds of completion of the application of the second electric field to the photoconductor.

(x) The control unit may control the control unit so as to apply a third electric field to the photoconductor before application of the second electric field to the photoconductor, where the third electric field has an identical strength to the first electric field.

(xi) The control unit may control the control unit and the reading unit so that the reading unit reads out a portion of a dark current increased by application of the second electric field, before detecting the charges generated by the photoconductor during the application of the first electric field to the photoconductor.

(5) The advantages of the present invention are explained below.

(a) According to the present invention, the electric field for recording or reading (i.e., the above first electric field) is applied to the photoconductor after a preliminary electric field (i.e., the above second electric field), which is stronger than the electric field for recording or reading, is applied to the photoconductor. As a result, the dark current level is lower than the dark current level achieved without the application of the preliminary electric field, for a certain duration after the termination of the application of the preliminary electric field. That is, a low-dark-current state is transiently realized. Therefore, when image information is recorded or read while the dark current level is low, it is possible to reduce the dark current component without damaging the true signal component carrying true image information. That is, an image can be recorded or read with a high S/N ratio.

(b) As described before, the low-dark-current state is realized only transiently, i.e., the low-dark-current state is not maintained for a long time. Therefore, it is preferable that the recording or reading of the image information is performed within about thirty seconds of the termination of the application of the preliminary electric field. Usually, it takes approximately one to ten minutes for the dark current to reach a stable leakage current level after the application of the preliminary electric field is completely stopped. Therefore, completion of the recording or reading of the image information within about thirty seconds of the termination of the application of the preliminary electric field makes sure that the recording or reading of the image information is performed in the low-dark-current state. In addition, since the dark current level is very low within about thirty seconds of the termination of the application of the preliminary electric field, the S/N ratio of the recorded or read image is further increased.

(c) As explained before, when an electric field for recording or reading is applied to the photoconductor, the dark current gradually decreases toward a stable leakage current level. However, when a preliminary voltage, which is stronger than the electric field for recording or reading, is momentarily applied to the photoconductor before the dark current reaches the stable leakage current, current injection from electrodes and trapping of the injected charges as space charges (accumulation of space charges) are accelerated by the strong electric field. That is, a state of space charge accumulation which is close to the state of space charge accumulation achieved by long-time application of the electric field for recording or reading can be realized in a short time. In other words, it is possible to reduce the time required for realizing the stable, high resistance state. Thus, it is preferable that an electric field having an identical strength to the electric field for recording or reading is applied to the photoconductor before application of the preliminary electric field. It is further preferable that the preliminary electric field is applied after a dark current which flows in response to the application of the above third electric field becomes stable (i.e., after the photoconductor enters a high resistance state). In this case, the duration in which the dark current level is low becomes long, and the effect of the present invention can be achieved even when the difference between the preliminary voltage and the reading voltage is small. Therefore, from the viewpoint of stability, it is preferable that the preliminary electric field is applied after the dark current which flows in response to the application of the above third electric field becomes stable.

(d) Since the charges stored in the charge storing portion before recording the image information constitutes a dark latent image component, the dark latent image component can be reduced when the charges corresponding to a dark latent image is read out from the image recording medium before recording the image information. In particular, at the beginning of the application of the second (preliminary) electric field, the dark current momentarily increases, and therefore the increased portion of the dark current is likely to be accumulated as a dark latent image in image recording systems. However, when the charges corresponding to a dark latent image is read out from the image recording medium, the influence of the increase in the dark current due to the application of the preliminary electric field can be eliminated. Further, as additional effects, an afterimage formed with charges left by a previous reading operation and photovoltaic noise can be suppressed.

It is further preferable that the operation of reading out charges corresponding to the dark latent image is performed after the termination of the application of the preliminary electric field.

(e) Although charges corresponding to a dark latent image are not accumulated in a sensor (detector) element including the photoconductor in the image reading systems, the dark current increases in response to the application of the preliminary electric field. In particular, the dark current momentarily increases at the beginning of the application of the preliminary electric field. A portion of the dark current increased by the application of the preliminary electric field may be output, and become a noise source. However, a portion of the dark current increased by the application of the preliminary electric field is read out and discarded before reading the image information, the influence of the dark current component increased by the application of the preliminary electric field can be eliminated.

DESCRIPTION OF PREFERRED EMBODIMENTS

Embodiments of the present invention are explained in detail below with reference to drawings.

Principle of the Present Invention

Although the dark current exhibits the aforementioned characteristic in response to application of an electric field to the photoconductor, the present inventor has further investigated the characteristics of the dark current, and has found that when an electric field applied to the photoconductor is suddenly reduced or the application of the electric field is completely stopped, first a large, momentary discharging current flows in the opposite direction to the aforementioned momentary charging current which first flows in response to the application of the electric field, and then a transient current (release current) flows, gradually decreases with time, and approaches a leakage current level corresponding to the strength of the reduced electric field. For example, the leakage current is approximately zero when the application of the electric field is completely stopped. In addition, the current response characteristic, i.e., the relationship between the dark current I and the time t, can be expressed as $I\ t^{-n}$. This relationship can be easily understood when viewed as a relationship between log I and log t, and indicates that there are broadly two types of space charges: one corresponding to relatively long time constants and the other corresponding to relatively short time constants. Thus, the dark current level is very low for a certain duration immediately after the reduction of the electric field applied to the photoconductor.

According to the present invention, a transient low-dark-current state is realized as above, and image information is recorded or read during the low-dark-current state. That is, the electric field being used in recording or reading and having predetermined strength and polarity is applied to the photoconductor after another electric field, which is stronger than the electric field used in recording or reading, is applied to the photoconductor for a certain duration, so that a low-dark-current state is transiently realized, and image information is recorded or read during the low-dark-current state.

Construction of First Embodiment

Figure 1:
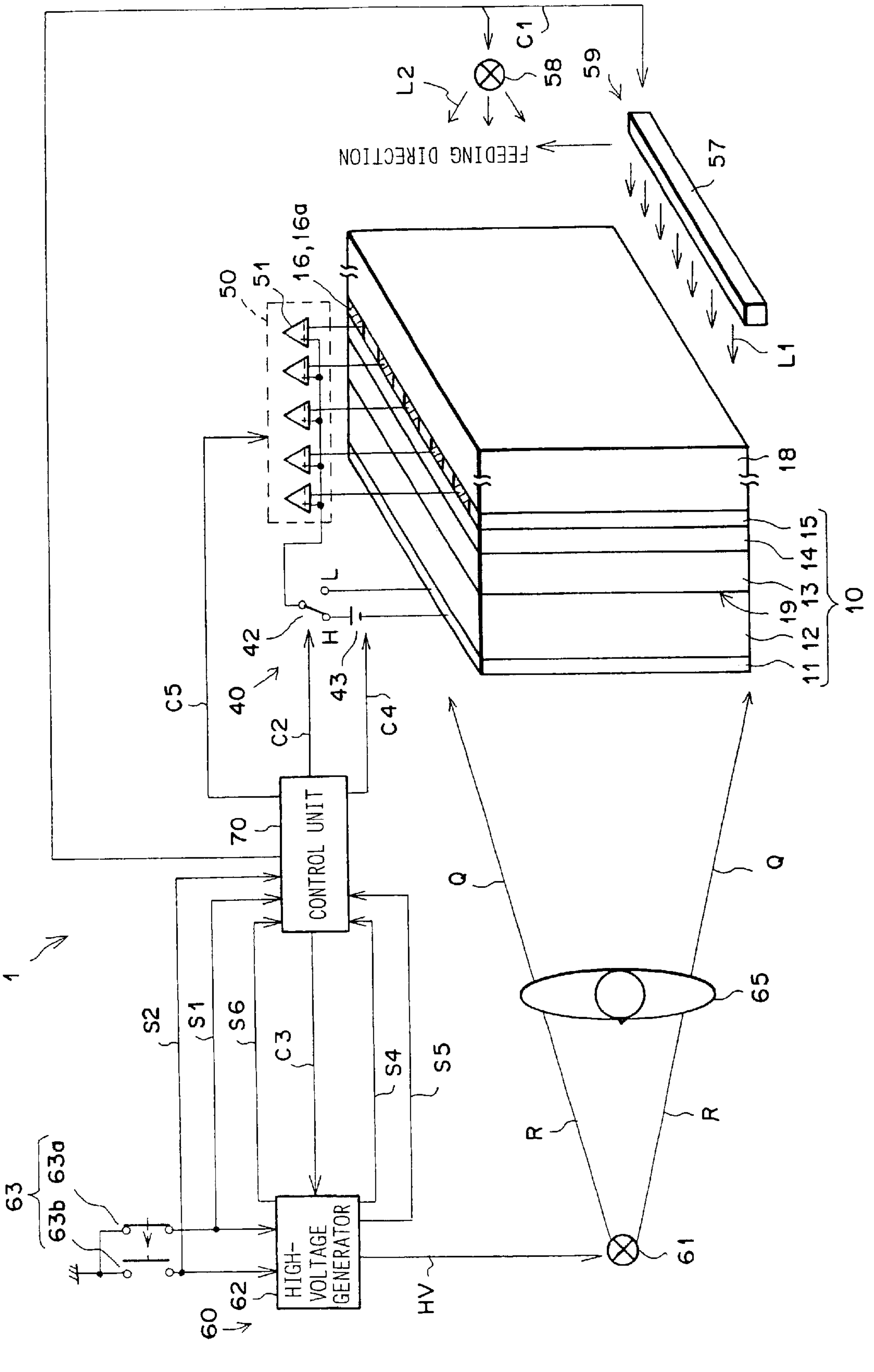
FIG. 1 illustrates an outline of a construction of a radiographic imaging system as a first embodiment of the present invention.

FIG. 1 illustrates an outline of the construction of the radiographic imaging system as the first embodiment of the present invention.

The radiographic imaging system 1 of FIG. 1 comprises a solid-state radiographic image detector 10, an electric-field application unit 40, a current detection circuit 50, a reading unit 59, an irradiation unit 60, and a control unit 70. The solid-state radiographic image detector 10 behaves as an image recording medium. The electric-field application unit 40 applies a predetermined electric field to the solid-state radiographic image detector 10, and is comprised of a switch 42 and a power supply 43. The control unit 70 controls the electric-field application unit 40, the current detection circuit 50, the reading unit 59, and the irradiation unit 60. The power supply 43 is a voltage-variable type power supply which can vary an output voltage according to a voltage control signal C4 supplied from the control unit 70. For example, the power supply 43 is a voltage-amplification-type high-voltage power supply.

The irradiation unit 60 irradiates a subject 65 with radiation R so that a portion of the radiation R which has penetrated through the subject 65 enters the solid-state radiographic image detector 10 as recording light Q which carries information on a radiographic image of the subject 65. The reading unit 59 comprises a reading-light scanning unit 57 and a preliminary-exposure light source 58. The preliminary-exposure light source 58 irradiates the entire surface of the solid-state radiographic image detector 10 with preliminary-exposure light L2 for preliminary readout. The reading unit 59 scans the surface of the solid-state radiographic image detector 10 with reading light L1, which is an electromagnetic radiation applied to the solid-state radiographic image detector 10 for reading the radiographic image. The current detection circuit 50 detects currents output from the solid-state radiographic image detector 10, i.e., signal charges generated in the solid-state radiographic image detector 10. The solid-state radiographic image detector 10 is a direct-conversion, optical-readout type electrostatic recording medium as disclosed in the coassigned U.S. Ser. No. 09/136,739, now U.S. Pat. No. 6,268,614.

When the recording-side photoconductive layer 12 in the solid-state radiographic image detector 10 is irradiated with the recording light Q, which enters the recording-side photoconductive layer 12 through the recording-side electrode layer 11, first pairs of opposite charges are generated in the recording-side photoconductive layer 12, and a radiographic image is recorded by storing portions of the pairs of opposite charges having a latent-image polarity as latent-image charges in a charge storing portion 19 which is formed at the boundary between the recording-side photoconductive layer 12 and the charge transport layer 13. Thereafter, when the reading-side electrode layer 15 is scanned with the reading light L1, second pairs of opposite charges are generated in the reading-side photoconductive layer 14, and portions of the second pairs of opposite charges having a polarity opposite to the latent-image charges are recombined with the latent-image charges. Thus, currents corresponding to the amount of the latent-image charges are generated. The reading-side electrode layer 15 includes a striped electrode array 16 which is comprised of a plurality of elements (linear electrodes) 16*a* (indicated by hatching in FIG. 1). The striped electrode array 16 is formed by depositing a material for the striped electrode array 16 on a support 18, and performing an etching operation or the like on the material. The support 18 is made of a material transparent to the reading light L1, such as glass.

The reading-light scanning unit 57 is arranged to emit the reading light L1 which has a cross section elongated in a direction approximately perpendicular to the length of each element 16*a*, and move in the length direction of the elements 16*a* so that the solid-state radiographic image detector 10 is scanned with and exposed to the reading light L1. The direction in which the cross section of the reading light L1 is elongated corresponds to the main scanning direction, and the length direction of the elements 16*a* corresponds to the feeding direction.

For example, as disclosed in the coassigned U.S. Ser. No. 09/404,371, now U.S. Pat. No. 6,376,857, the reading-light scanning unit 57 can be realized by a planar electroluminescent (EL) light source, and integrally formed with the solid-state radiographic image detector 10, where the planar electroluminescent (EL) light source emits electroluminescent (EL) light having a linear cross section, and the electroluminescent (EL) light moves in the length direction of the elements 16*a* under electrical scanning control. Since the planar electroluminescent (EL) light source can be controlled so as to concurrently emit electroluminescent (EL) light from the entire surface of the planar electroluminescent (EL) light source, the planar electroluminescent (EL) light source can also be used as the preliminary-exposure light source 58.

The control unit 70 supplies a control signal C1 to both of the reading-light scanning unit 57 and the preliminary-exposure light source 58. When the control signal C1 is placed at the low (L) level, the radiographic imaging system 1 operates in a preliminary-exposure mode, i.e., the preliminary-exposure light source 58 is activated, and emits the preliminary-exposure light L2. When the control signal C1 is placed at the high (H) level, the radiographic imaging system 1 operates in a reading light mode, i.e., the reading-light scanning unit 57 is activated, and the solid-state radiographic image detector 10 is scanned with the reading light L1. When the control signal C1 is in a high-impedance state, neither of the reading-light scanning unit 57 and the preliminary-exposure light source 58 operates, i.e., the solid-state radiographic image detector 10 is irradiated with neither of the reading light L1 and the preliminary-exposure light L2.

The current detection circuit 50 comprises a plurality of detection amplifiers 51 each of which includes an operational amplifier as a main constituent, and inverted (−) input terminals of the plurality of detection amplifiers 51 are respectively connected to the plurality of elements 16*a*. The recording-side electrode layer 11 of the solid-state radiographic image detector 10 is connected to the negative electrode of the power supply 43 and one of two input terminals of the switch 42. The positive electrode of the power supply 43 is connected to the other input terminal of the switch 42. The output terminal of the switch 42 is commonly connected to the non-inverted (+) input terminals of the plurality of detection amplifiers 51.

When the striped-electrode-array side of the solid-state radiographic image detector 10 is scanned with the reading light L1, the plurality of detection amplifiers 51 concurrently detect currents respectively output through the linear electrodes 16*a*.

The control unit 70 supplies a control signal C5 to the current detection circuit 50. When the control signal C5 is placed at the low (L) level, the current detection circuit 50 detects the above currents. When the control signal C5 is placed at the high (H) level, the preliminary readout is performed, i.e., the current output from the solid-state radiographic image detector 10 is discarded, for example, by resetting the output voltages of the plurality of detection amplifiers 51.

The plurality of detection amplifiers 51 can have well known constructions. Since the constructions of the plurality of detection amplifiers 51 per se are not essential to the present invention, the details of the constructions of the plurality of detection amplifiers 51 are not explained in this specification. For example, depending on the constructions of the plurality of detection amplifiers 51, the plurality of detection amplifiers 51 may be connected to the switch 42, the power supply 43, and the linear electrodes 16*a* in different manners from those illustrated in FIG. 1.

The irradiation unit 60 comprises a radiation source 61, a high-voltage generator 62, and a switch 63. The radiation source 61 generates the radiation R. The high-voltage generator 62 generates power for driving the radiation source 61. The switch 63 is a dual switch comprising two switch elements 63*a* and 63*b*. The switch element 63*b* turns on only when the switch element 63*a* is turned on.

In order to enable the radiographic imaging system to automatically operate at predetermined timings as explained later, signals S1 and S2 from the switch elements 6*a* and 63*b*, a standby signal S4 from the high-voltage generator 62, an irradiation complete signal S5 indicating completion of the irradiation with the radiation R, and a signal S6 indicating an exposure time with the radiation R are supplied to the control unit 70, where the exposure time is preset. The control unit 70 outputs the control signal C1 to the reading unit 59, a control signal C2 to the switch 42 in the electric-field application unit 40, a control signal C3 to the high-voltage generator 62, the voltage control signal C4 to the power supply 43, and the control signal C5 to the current detection circuit 50.

When the control signal C2 is placed at the high (H) level, the switch 42 is turned to the side of the power supply 43, and a DC voltage is applied from the power supply 43 to the solid-state radiographic image detector 10, and more specifically between the recording-side electrode layer 11 and the striped electrode array 16. Thus, an electric field is applied to the recording-side photoconductive layer 12 and the reading-side photoconductive layer 14. On the other hand, when the control signal C2 is placed at the low (L) level, the switch 42 is turned to the side of the recording-side electrode layer 11, and the recording-side electrode layer 11 and the striped electrode array 16 are substantially short-circuited through imaginary short circuits realized in the operational amplifiers constituting the plurality of detection amplifiers 51. That is, when the control signal C2 is placed at the low (L) level, the recording-side electrode layer 11 and the striped electrode array 16 are placed at the same potential. When the control signal C2 is placed in a high-impedance state, the switch 42 is fixed to a midpoint between the input terminals H and L, and therefore no voltage is applied to the solid-state radiographic image detector 10, and electric potentials of the recording-side electrode layer 11 and the striped electrode array 16 are not equalized. In addition, when the control signal C3 supplied to the high-voltage generator 62 is placed at the high (H) level, the high-voltage generator 62 supplies a high voltage HV to the radiation source 61 so that the radiation source 61 generates the radiation R.

In the process of recording of a latent image in the solid-state radiographic image detector 10 in the radiographic imaging system 1 of FIG. 1, a preliminary voltage is applied between the recording-side electrode layer 11 and the striped electrode array 16 before application of a record voltage to the solid-state radiographic image detector 10. In addition, the preliminary-exposure light L2 is applied to the solid-state radiographic image detector 10 for preliminary readout. In these respects, the radiographic imaging system 1 of FIG. 1 differs from the conventional radiographic imaging systems. In order to realize the above operations in the radiographic imaging system 1 of FIG. 1, starting and stopping of the applications of the preliminary voltage and the preliminary-exposure light L2 are controlled. Hereinbelow, the operations of the radiographic imaging system 1 of FIG. 1 are explained with particular emphasis on the above control operations of starting and stopping the applications of the preliminary voltage and the preliminary-exposure light L2.

1st Mode of Operation of 1st Embodiment

Figure 2:
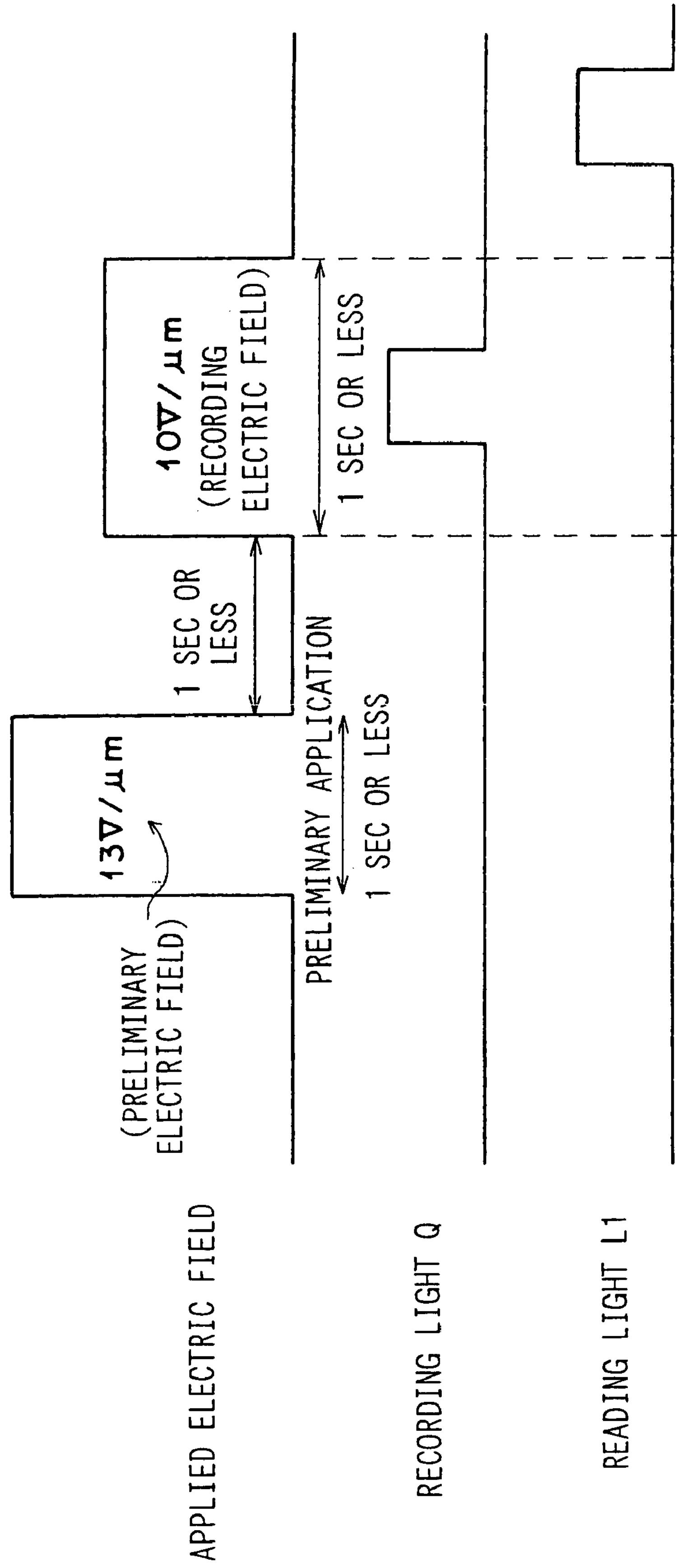
FIG. 2 is a timing diagram indicating timings of application of electric fields, recording light, and reading light in a first mode of operation of the radiographic imaging system 1 of FIG. 1.

FIG. 2 is a timing diagram indicating timings of application of the electric fields, the recording light, and the reading light in the first mode of operation of the radiographic imaging system 1 of FIG. 1. In the first mode of operation, first, a preliminary voltage, which is higher than a recording voltage (a voltage applied between the recording-side electrode layer 11 and the striped electrode array 16 when a latent image is recorded in the solid-state radiographic image detector 10), is applied to the solid-state radiographic image detector 10 for a predetermined duration. After the application of the preliminary voltage is completed, the recording voltage is applied to the solid-state radiographic image detector 10, and a latent image is recorded in the solid-state radiographic image detector 10. Specifically, the application of the preliminary voltage is performed as follows.

First, the control signal C1 supplied to the reading unit 59 is placed in a high-impedance state so that emission of the reading light L1 and the preliminary-exposure light L2 is stopped. Next, the control signal C2 is placed at a high (H) level so that the switch 42 is turned to the side of the power supply 43, and the preliminary voltage (which is higher than the recording voltage and supplied from the power supply 43) is applied between the recording-side electrode layer 11 and the striped electrode array 16. As a result of the application of the preliminary voltage, the recording-side electrode layer 11 and the striped electrode array 16 are charged, and the electric potential gradient in the recording-side photoconductive layer 12 becomes, for example, about 13 V/μm. The preliminary voltage can be maintained at a desired level by appropriately controlling the output voltage of the power supply 43 based on the voltage control signal C4.

After the preliminary voltage is applied between the recording-side electrode layer 11 and the striped electrode array 16 for a predetermined duration (e.g., about one second), the control signal C2 is placed at a low (L) level, the switch 42 is turned to the side of the recording-side electrode layer 11 so that the recording-side electrode layer 11 and the striped electrode array 16 are substantially short-circuited through the aforementioned imaginary short circuits in the operational amplifiers. Thus, the application of the preliminary voltage is completed.

Thereafter, within a predetermined time (e.g., about thirty seconds or more preferably about one second) of the completion of the application of the preliminary voltage, the recording-side electrode layer 11 is exposed to the recording light Q (i.e., the aforementioned portion of the radiation R which has penetrated through the subject 65) while applying the recording voltage to the solid-state radiographic image detector 10. Thus, a latent image is recorded in the solid-state radiographic image detector 10. Specifically, the recording of the latent image is performed as follows.

First, the control signal C2 is returned to the high (H) level, the switch 42 is turned to the side of the power supply 43, and a DC voltage having a predetermined magnitude and being supplied from the power supply 43 is applied as the recording voltage between the recording-side electrode layer 11 and the striped electrode array 16 so that the recording-side electrode layer 11 and the striped electrode array 16 are charged, and the electric potential gradient in the recording-side photoconductive layer 12 becomes, for example, about 10 V/μm. The strength of the electric field can be maintained at a desired level by appropriately controlling the output voltage of the power supply 43 based on the voltage control signal C4.

Thereafter, within a predetermined time (e.g., about thirty seconds or more preferably about one second) of the completion of the application of the preliminary voltage, the high voltage HV is supplied from the high-voltage generator 62 to the radiation source 61 so that the radiation source 61 irradiates the subject 65 with the radiation R, and the solid-state radiographic image detector 10 is exposed to the recording light Q (i.e., the aforementioned portion of the radiation R which has penetrated through the subject 65, and carries information on the radiographic image of the subject 65) for an exposure time, which is preset. Due to the exposure to the recording light Q, pairs of positive and negative charges are generated in the recording-side photoconductive layer 12 of the solid-state radiographic image detector 10, and the negative charges in the pairs move along electric fields determined by the arrangement of the plurality of elements (linear electrodes) 16*a* constituting the striped electrode array 16, and are stored as latent-image charges in the charge storing portion 19 located at the boundary between the recording-side photoconductive layer 12 and the charge transport layer 13.

Since the amount of the latent-image charges is approximately proportional to the exposure dose of the radiation R, and proportional to the intensity of the recording light Q, the latent-image charges carry a latent image. On the other hand, the positive charges in the pairs generated in the recording-side photoconductive layer 12 are attracted by the recording-side electrode layer 11, and are recombined with negative charges supplied from the power supply 43. Thus, the positive charges vanish.

When the recording of the latent image is completed, the control signal C2 is placed in a high-impedance state, and the application of the recording voltage is terminated in order to prevent superimposition of unnecessary dark current components.

Figure 3A:
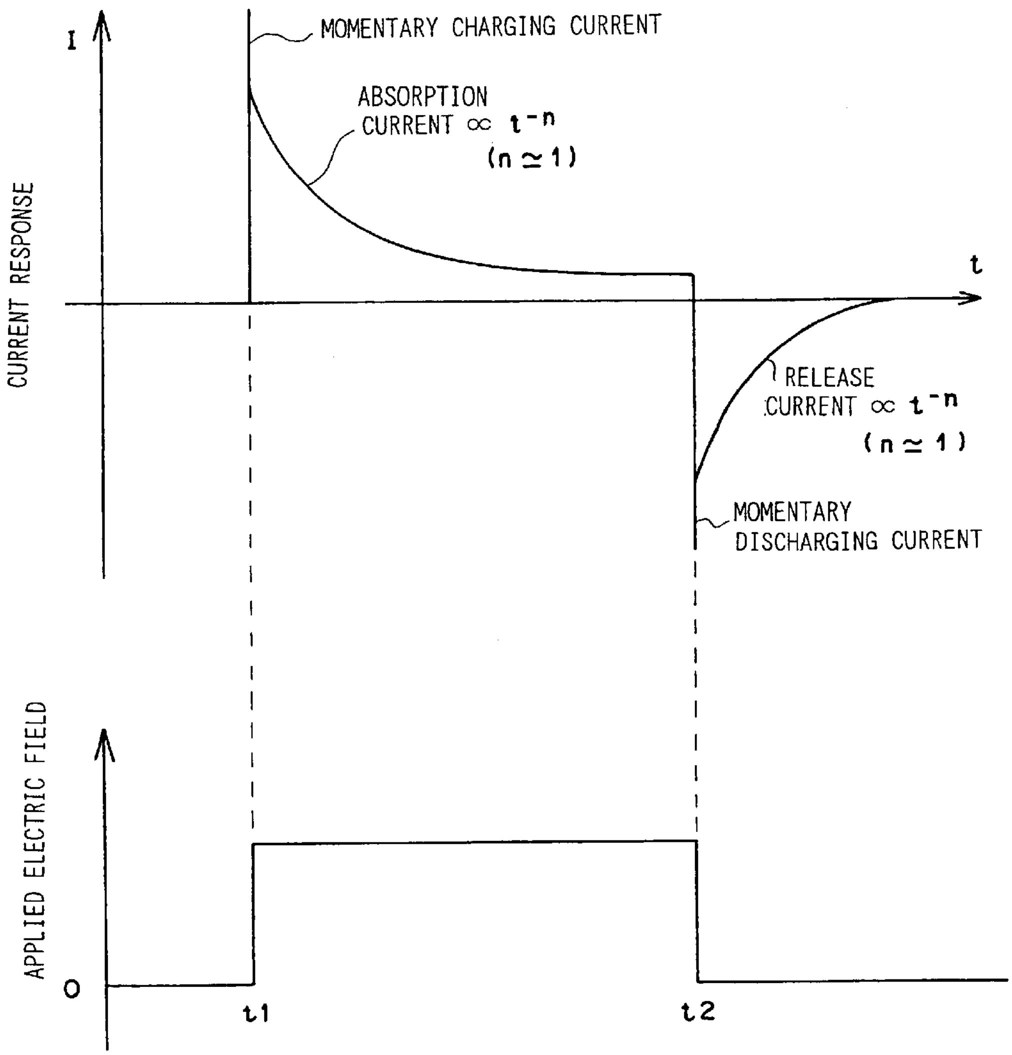
FIG. 3A is a timing diagram indicating basic time response characteristics (i.e., basic current response characteristics) of dark current components which are generated in response to start and stop of application of an electric field to a photoconductor, respectively.

FIG. 3A is a timing diagram indicating basic time response characteristics (i.e., current response characteristics) of dark current components which are generated in response to start and stop of application of an electric field to a photoconductor, respectively.

From the beginning of application of a voltage (which is generally high) between the recording-side electrode layer 11 and the striped electrode array 16 until the short-circuiting of the recording-side electrode layer 11 and the striped electrode array 16, electric charges can be injected into the recording-side photoconductive layer 12. A portion of the injected electric charges is trapped in the recording-side photoconductive layer 12 as space charges, and the remaining portion of the injected electric charges is untrapped, and causes a leakage current flowing through the recording-side photoconductive layer 12. That is, a dark current flows in the recording-side photoconductive layer 12.

As indicated in FIG. 3A, a very large, momentary charging current flows as the dark current at the beginning (time t1) of the application of the electric field (voltage). Thereafter, an absorption current flows, and gradually decreases with time, and finally a constant leakage current flows. Next, when the application of the electric field (voltage) is completely terminated, a very large, momentary discharging current having the opposite polarity to the above momentary charging current flows immediately after the termination of the application of the electric field (voltage). Thereafter, a release current flows, and gradually decreases with time to a approximately zero level. That is, the dark current level at the beginning (time t1) of the application of the electric field (voltage) is higher than the constant leakage current level. The stronger the applied electric field is, i.e., the higher the applied voltage is, the greater the difference between the dark current level at the beginning (time t1) of the application of the electric field (voltage) and the constant leakage current level becomes. When the applied voltage is high, it takes, for example, 10 minutes or more for the current level to reach the stable leakage current level.

The above gradual decrease in the current can be regarded as an increase in the resistance of the solid-state radiographic image detector. That is, the device resistance is not constant. The longer the duration for which the voltage is applied is, the greater the device resistance becomes.

The above increase in the resistance of the solid-state radiographic image detector does not greatly depend on the thickness of the recording-side photoconductive layer. Instead, it should be considered that space charges which increase the device resistance are gradually accumulated at the boundary, and the state of the space charges at the boundary varies with time.

Figure 3B:
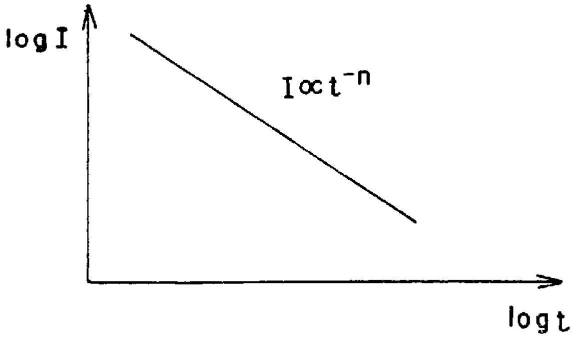
FIG. 3B is a graph indicating in a logarithmic scale the time response characteristics of a dark current component, which is proportional to $t^{-n}$.

FIG. 3B is a graph indicating in a logarithmic scale the time response characteristics of the dark current component, which is proportional to $t^{-n}$. The above current response indicated in FIG. 3A correspond to a relationship I $t^{-n}$. Although this relationship is clear in the log-log scale in FIG. 3B, the current behavior does not correspond to a certain time constant. The above current response is considered to indicate that broadly two types of space charges are distributed: one type can be quickly injected and discharged, and another type can be injected and discharged only slowly. In other words, the time constants which determine the behavior of the former type of space charges at the boundary between recording-side electrode layer and the recording-side photoconductive layer are relatively small, and the time constants which determine the behavior of the latter type of space charges at the boundary are relatively large. For example, the time constants of the former type of space charges are about several seconds, and the time constants of the latter type of space charges are more than one minute.

In addition, even after the dark current is once stabilized, and the recording-side electrode layer 11 and the striped electrode array 16 are short-circuited so as to pause application of a voltage between the recording-side electrode layer 11 and the striped electrode array 16 for a while, the dark current level tends to rise to the original, high level at the beginning of the next application of the electric field (voltage). Therefore, a dark latent image generated by the high level dark current at the beginning of the next application of the electric field causes great noise. Further, The intensity of the dark latent image varies depending on the history of use and the duration of the absorption current, i.e., the time which elapses after the beginning of the application of the voltage until irradiation with the recording light. Therefore, it is difficult to correct the image data so that the noise due to the dark latent image does not appear in a regenerated image.

Figure 4:
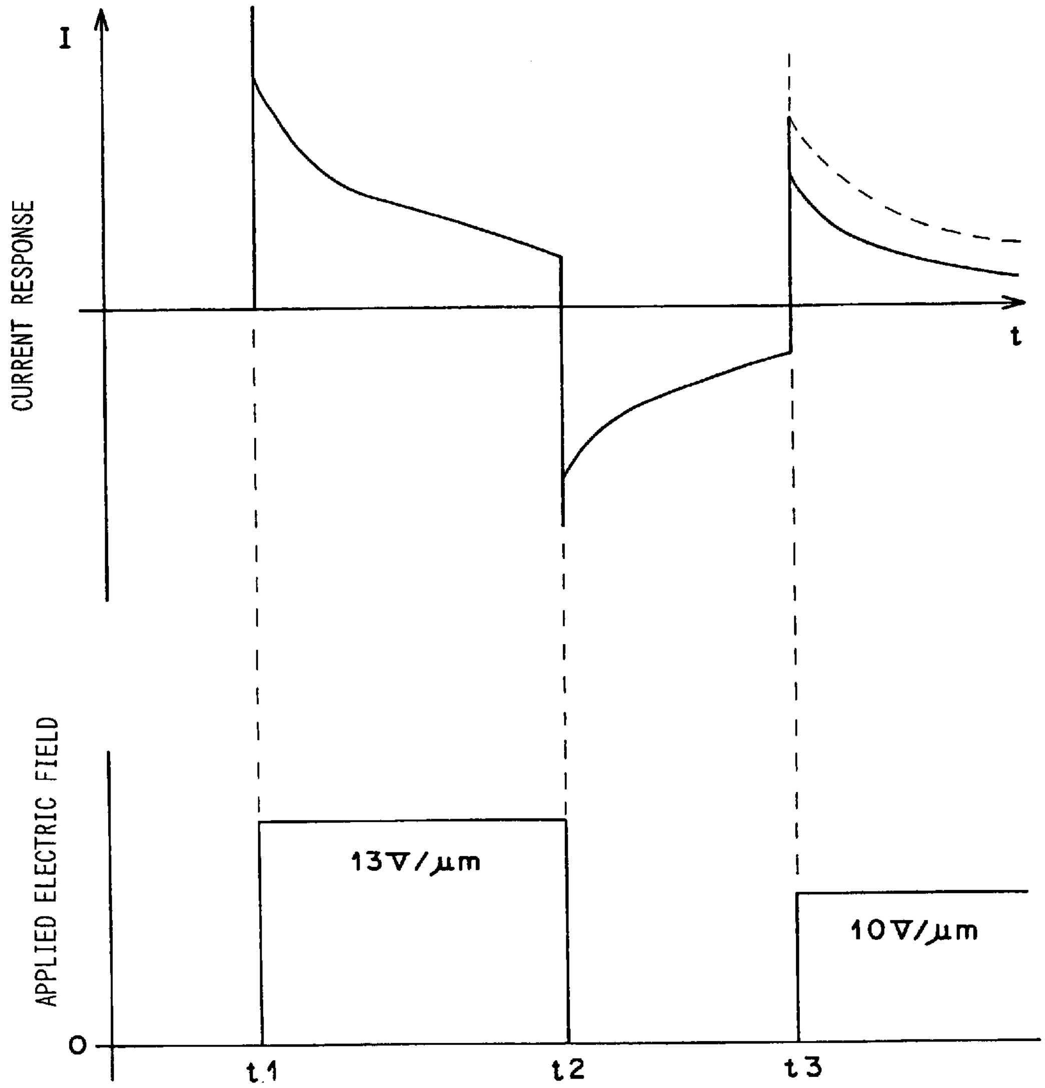
FIG. 4 is a timing diagram indicating current response characteristics in the first mode of operation in the first embodiment of the present invention.

FIG. 4 is a timing diagram indicating current response characteristics in the first mode of operation in the first embodiment of the present invention. As mentioned before, in the aforementioned first mode of operation, a preliminary voltage which is higher than a recording voltage is applied between the recording-side electrode layer 11 and the striped electrode array 16 of the solid-state radiographic image detector 10 for a predetermined duration, and thereafter the recording voltage is applied between the recording-side electrode layer 11 and the striped electrode array 16. In this case, at the time (t3) at which the recording voltage is applied, a momentary charging current and an absorption current corresponding to the application of the recording voltage are added to a release current corresponding to the application of the preliminary voltage which is still flowing. Therefore, as indicated in FIG. 4, the level of the dark current including the momentary charging current and the absorption current corresponding to the application of the recording voltage is lower than the level (indicated by the dashed curve in FIG. 4) of a dark current which flows when the reading voltage is applied without the application of the preliminary voltage. Thereafter, the level of the dark current decreases toward the leakage current level. In the state in which the dark current is the stable leakage current, negative space charges which realize a stable, high resistance state are distributed in the recording-side photoconductive layer 12 and the interface between the recording-side photoconductive layer 12 and the recording-side electrode layer 11, and the intensity of the dark latent image stored in the charge storing portion 19 is low. That is, the application of a high, preliminary voltage for a relatively short duration immediately before the recording can realize, in a short time, the high resistance state which is achieved by the application of the recording voltage for a long duration. In particular, when the preliminary voltage is very high, a very large dark current having the opposite polarity momentarily flows. Therefore, in appearance, a very high device resistance is realized. Thus, when a recording voltage is applied for a short duration (of about one second or shorter) after the application of the preliminary voltage, and image information is recorded within the short duration, the high-level noise due to the dark latent image, which is likely to be produced in the conventional photoconductor, is less likely to be produced. That is, the noise due to the dark latent image can be suppressed according to the present invention.

In addition, since the level of the absorption current is lowered due to the application of the preliminary voltage as explained above, the level of the dark current reaches the leakage current level more quickly than the level of the dark current which flows when the reading voltage is applied without the application of the preliminary voltage. Therefore, even when the recording is performed within a relatively short time (about thirty seconds or shorter) of the termination of the application of the preliminary voltage, the intensity of the dark latent image is more stabilized than the conventional operation without the application of the preliminary voltage, and it thus becomes easy to correct image data so that the dark latent image does not appear in a regenerated image.

After the image information is recorded as above, the latent image is read out from the solid-state radiographic image detector 10 as follows.

First, the control signal C2 is placed at the low (L) level, the switch 42 is turned to the side of the recording-side electrode layer 11, and the recording-side electrode layer 11 and the striped electrode array 16 are substantially short-circuited through the aforementioned imaginary short circuits in the operational amplifiers. Thus, charges are rearranged. Then, the control signal C1 is placed at a high (H) level so that the radiographic imaging system 1 operates in the reading light mode, in which the reading-light scanning unit 57 scans the solid-state radiographic image detector 10 with the reading light L1, and the latent image is electrically read out by using light-induced discharge caused by pairs of charges (electrons and holes) generated in the reading-side photoconductive layer 14. Specifically, the latent image is read out as follows.

When the solid-state radiographic image detector 10 is scanned with the reading light L1 having a linear cross section, pairs of charges (electrons and holes) are generated in a linear portion of the reading-side photoconductive layer 14 corresponding to a feeding position and being exposed to the reading light L1, and the positive charges in the pairs generated in the reading-side photoconductive layer 14 are attracted by the negative charges (latent-image charges) stored in the charge storing portion 19, rapidly move through the charge transport layer 13, and vanish due to charge recombination with the negative charges (latent-image charges) in the charge storing portion 19. On the other hand, the negative charges in the pairs generated in the reading-side photoconductive layer 14 vanish due to charge recombination with positive charges which are supplied from the power supply 43 to the striped electrode array 16. As described above, the latent-image charges stored in the charge storing portion 19 vanish by the charge recombination, and currents corresponding to the above movement of the charges flow in the solid-state radiographic image detector 10. These currents are concurrently detected by the plurality of detection amplifiers 51 connected to the elements **16*a* of the striped electrode array 16. The currents flowing in the solid-state radiographic image detector 10** correspond to the latent-image charges, i.e., the latent image. Since the amounts of the currents correspond to the brightness of respective portions of the latent image, and no current flows in dark portions of the latent image, an image signal representing the latent image can be obtained by detecting the currents. Thus, the latent image can be read out. A radiographic imaging system in which both of the electrodes of the solid-state radiographic image detector are short-circuited after recording of a latent image, and larger currents flows in brighter portions of the latent image as described above is called a positive-type radiographic imaging system, and a solid-state radiographic image detector used in the positive-type radiographic imaging system is called a positive-type radiographic image detector.

2nd Mode of Operation of 1st Embodiment

Figure 5:
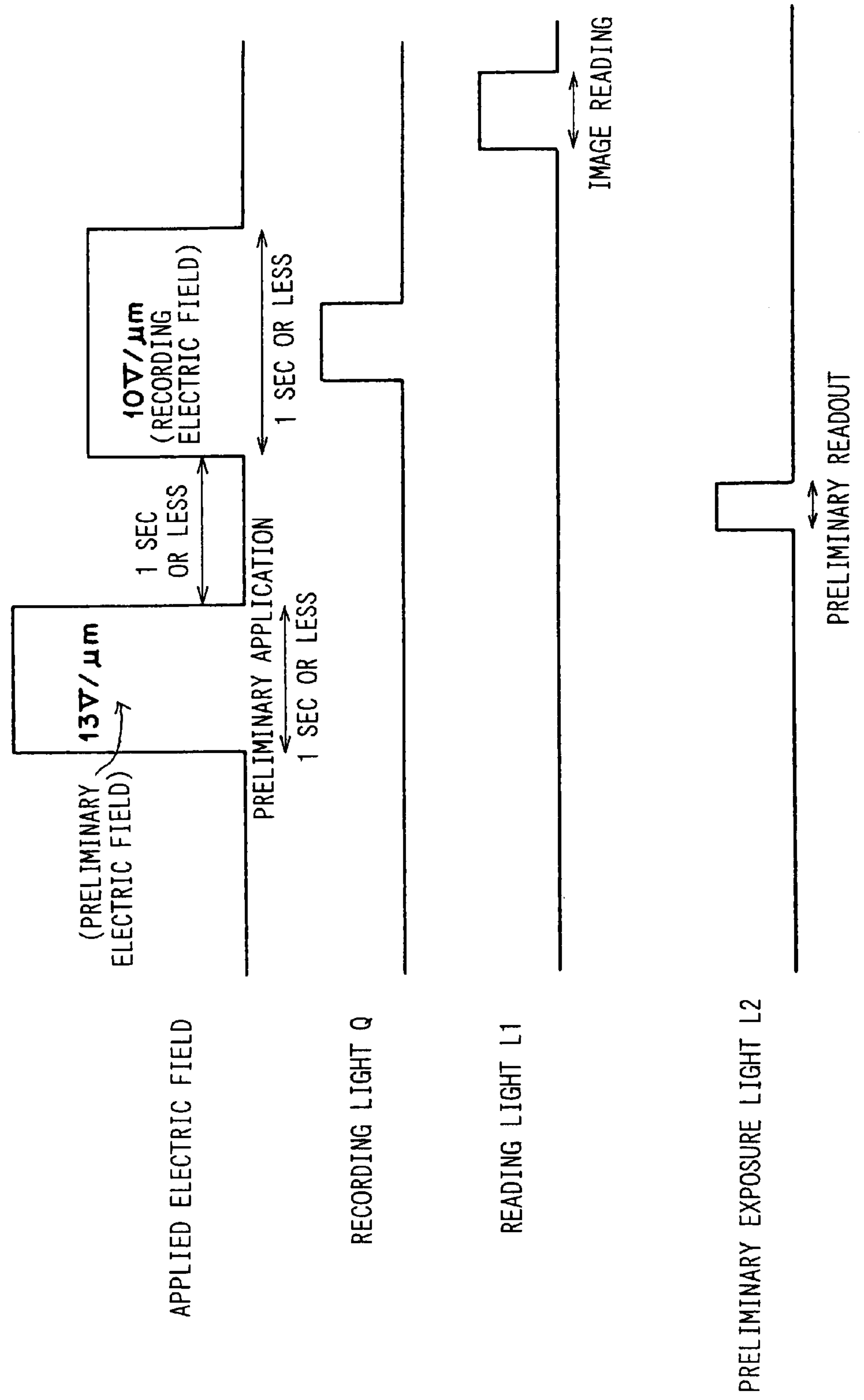
FIG. 5 is a timing diagram indicating timings of application of electric fields, recording light, reading light, and preliminary exposure light in a second mode of operation of the radiographic imaging system 1 of FIG. 1.

FIG. 5 is a timing diagram indicating timings in the second mode of operation of the radiographic imaging system 1 of FIG. 1. In the direct-conversion, optical-readout type solid-state radiographic image detector 10 used in the first embodiment, an increased portion of the dark current due to the application of the preliminary voltage is accumulated in the charge storing portion 19 as a dark latent image. In the second mode of operation, preliminary readout is performed in order to discharge the dark latent image component after the application of the preliminary voltage, and thereafter an electrostatic latent image is recorded. Thus, the influence of the increased portion of the dark current due to the application of the preliminary voltage is reduced. Details of the second mode of operation are as follows.

First, the preliminary voltage is applied in a similar manner to the first mode of operation. After the application of the preliminary voltage is terminated, the control signal C1 supplied to the preliminary-exposure light source 58 is placed at a low (L) level so that the radiographic imaging system 1 operates in the preliminary exposure mode. Then, the electric potentials of the recording-side electrode layer 11 and the striped electrode array 16 are equalized, and the reading-side electrode layer 15 of the solid-state radiographic image detector 10 is exposed to the preliminary-exposure light L2. Thus, currents corresponding to unnecessary charges stored in the charge storing portion 19 are output from the solid-state radiographic image detector 10. Therefore, in order to drain off the above currents corresponding to the unnecessary charges, the control signal C5 supplied to the current detection circuit 50 is placed at the high (H) level so that the current detection circuit 50 performs the preliminary readout. Thereafter, in order to stop the preliminary readout, the control signal C1 is placed in a high-impedance state, and the control signal C5 is placed at the low (L) level.

After the preliminary readout is completed, in order to record an electrostatic latent image in the solid-state radiographic image detector 10, the recording-side electrode layer 11 is exposed to the recording light Q while applying the recording voltage between the recording-side electrode layer 11 and the striped electrode array 16 in a similar manner to the first mode of operation. Since, in the second mode of operation, the unnecessary charges stored in the charge storing portion 19 can be removed as described above, it is possible to suppress an influence of an afterimage formed with charges left by the previous image pickup operation as well as the dark latent image due to the dark current.

Incidentally, in the positive-type solid-state radiographic image detectors as used in the present embodiment, a barrier electric field is formed at the interface between the reading-side photoconductive layer (made of a-Se or the like) and the reading-side electrode layer (transparent to the reading light). Therefore, even when the radiation dose of the recording light is near 0 mR, currents flow due to exposure to the reading light. The above phenomenon is known as the photovoltaic noise.

In addition, since both of the electrodes of the solid-state radiographic image detector are short-circuited after application of the recording voltage before reading of the latent image, an electric field due to the history of the (generally high) voltage application and the short-circuiting is generated at the interface between the reading-side photoconductive layer and the reading-side electrode layer. It is well known that a problem called high-voltage-application-historical noise occurs when the solid-state radiographic image detector having the above electric field is exposed to light (reading light).

On the other hand, in the second mode of operation, the preliminary readout is performed by exposing the reading-side photoconductive layer 14 with the preliminary-exposure light L2 while equalizing the electric potentials of the recording-side electrode layer 11 and the striped electrode array 16, and thereafter an electrostatic latent image is recorded by exposing the reading-side photoconductive layer 14 with the recording light Q while applying a recording voltage between the recording-side electrode layer 11 and the striped electrode array 16. In this case, optical fatigue is momentarily produced (i.e., trapped charges are momentarily accumulated) at the light-entrance interface of the reading-side photoconductive layer 14 (in which electron-hole pairs are produced) when the reading-side photoconductive layer 14 is exposed to the preliminary-exposure light L2. Therefore, the photovoltaic noise generated by the exposure to the reading light L1 is reduced and stabilized by the optical fatigue. That is, according to the second mode of operation, the photovoltaic noise is reduced as well as the dark latent image and the afterimage.

Even when the aforementioned high-voltage-application-history noise is dominant, i.e., even when the influence of the electric field caused by space charges which are injected from the striped electrode array 16 and trapped at the boundary is greater than the influence of the aforementioned barrier electric field, the space charges accumulated at the boundary between the reading-side photoconductive layer and the striped electrode array are reduced and stabilized, i.e., the aforementioned high-voltage-application-history noise can be reduced, by the preliminary exposure.

Construction of Second Embodiment

Figure 6:
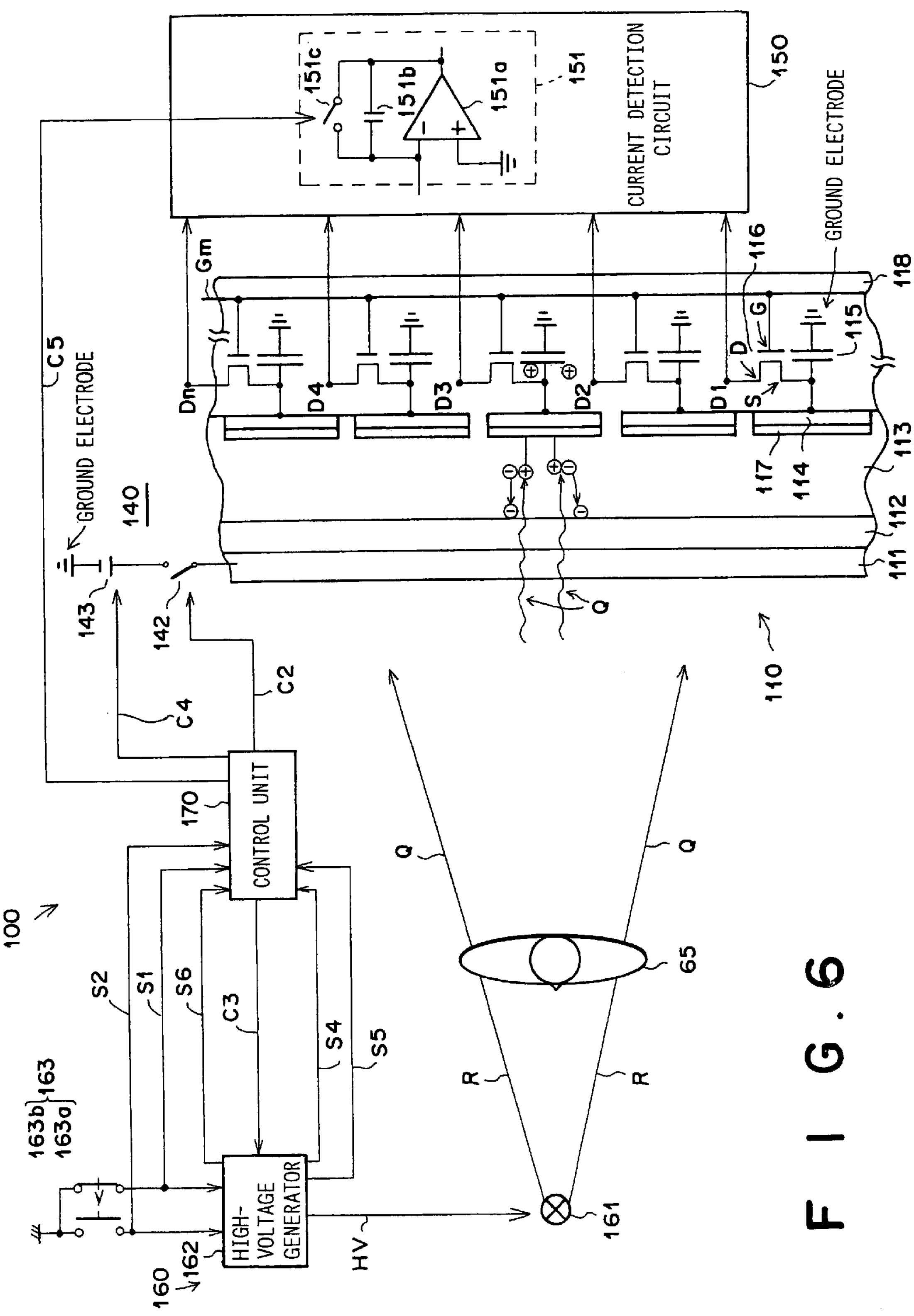
FIG. 6 illustrates an outline of a construction of a radiographic imaging system as a second embodiment of the present invention.

FIG. 6 illustrates an outline of the construction of the radiographic imaging system as the second embodiment of the present invention.

The radiographic imaging system 100 of FIG. 6 comprises a solid-state radiographic image detector 110, an electric-field application unit 140, a current detection circuit 150, an irradiation unit 160, and a control unit 170. The solid-state radiographic image detector 110 behaves as an image recording medium. The electric-field application unit 140 applies a predetermined electric field to the solid-state radiographic image detector 110, and is comprised of a switch 142 and a power supply 143. The control unit 170 controls the switch 142, the power supply 143, the current detection circuit 150, and the irradiation unit 160. The power supply 143 is a voltage-variable type power supply which can vary an output voltage according to a voltage control signal C4 supplied from the control unit 170. The current detection circuit 150 detects currents output from the solid-state radiographic image detector 110. The irradiation unit 160 and the control unit 170 have similar constructions to the irradiation unit 60 and the control unit 70 in the first embodiment, respectively.

The current detection circuit 150 comprises a plurality of detection amplifiers 151 corresponding to a plurality of pixels connected to each data line (which is explained later), and each of the plurality of detection amplifiers 151 has a construction of a charge amplifier constituted by a readout amplifier 151*a*, an integrating capacitor 151*b*, and a reset switch 151*c*. Typically, the current detection circuit 150 is integrated with the solid-state radiographic image detector 110.

The solid-state radiographic image detector 110 is a direct-conversion, TFT-readout type image recording medium as disclosed in U.S. Pat. No. 5,648,660, Japanese Unexamined Patent Publication No. 9(1997)-206293, and the like. In the solid-state radiographic image detector 110, a recording-side electrode layer 111, an insulator 112, and a photoconductive layer 113 are formed in this order, where the recording-side electrode layer 111 is transparent to X rays, and the photoconductive layer 113 is made of a-Se or the like, and generates charges, i.e., exhibits conductivity, when X rays enter the photoconductive layer 113. In addition, between the photoconductive layer 113 and a support 118, a plurality of detection elements are two-dimensionally arranged in the directions of rows (lines) and columns, and each of the plurality of detection elements comprises a charge collection electrode 114, a signal accumulation capacitor 115, and a thin-film transistor (TFT) 116. The charge collection electrode 114 collects latent-image charges generated in the photoconductive layer 113. The signal accumulation capacitor 115 stores the latent-image charges collected by the charge collection electrode 114. Further, a thin-film transistor (TFT) 116 is provided for reading out the latent-image charges stored in each signal accumulation capacitor 115. The TFT 116 corresponding to each signal accumulation capacitor 115 can be considered to be an additional constituent of the detection element.

The recording-side electrode layer 111 is connected to a positive electrode of the power supply 143 through the switch 142. Each charge collection electrode 114 is connected to one of the two electrodes of the corresponding signal accumulation capacitor 115 and a source terminal S of the corresponding TFT 116, and the other electrode of the signal accumulation capacitor 115 is commonly connected to a common ground electrode of the solid-state radiographic image detector 110. In addition, a blocking layer 117 is arranged between each charge collection electrode 114 and the photoconductive layer 113.

Figure 7:
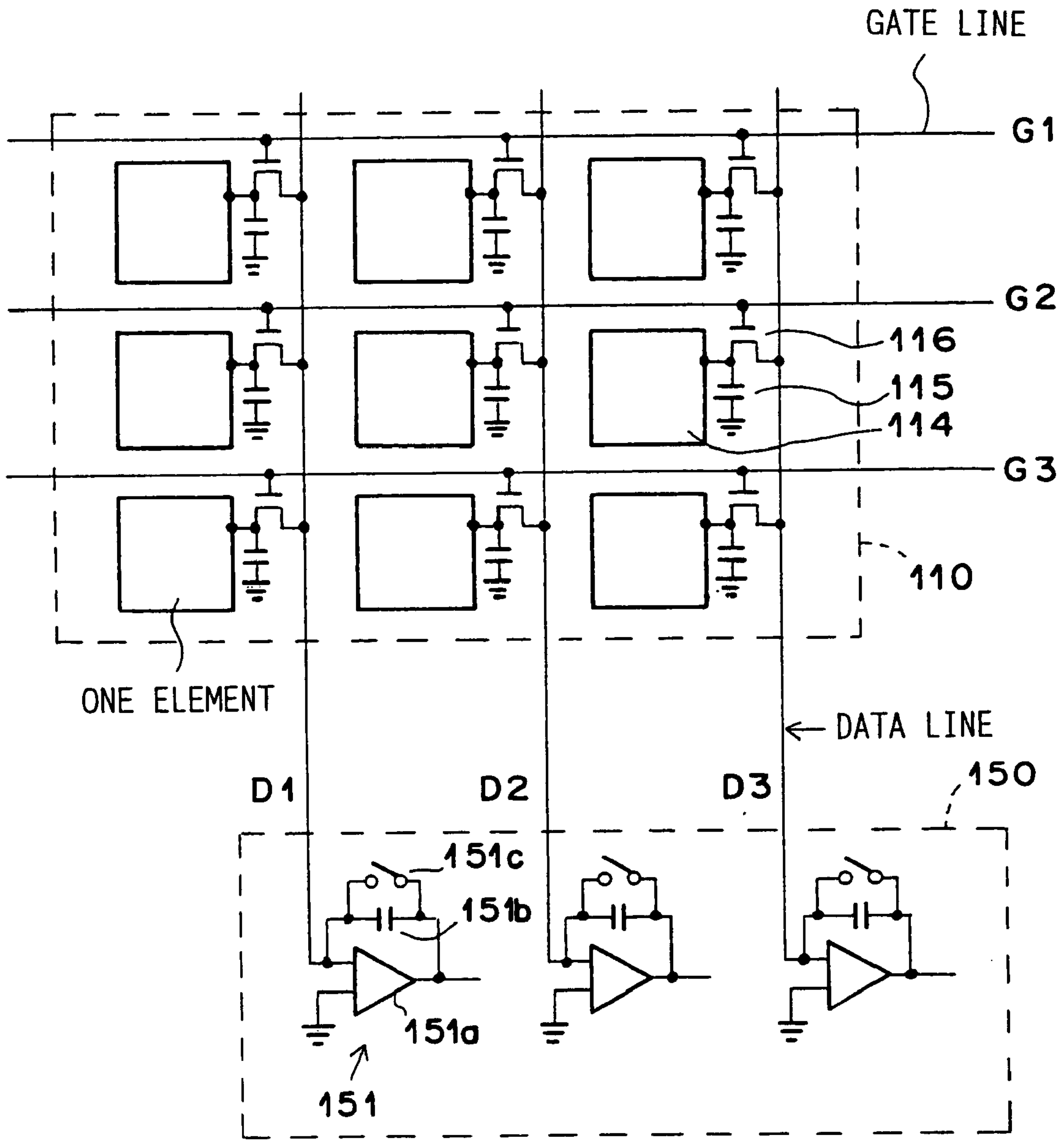
FIG. 7 is a circuit diagram of a solid-state radiographic image detector, in which an arrangement of a portion of a plurality of detection elements is illustrated.

FIG. 7 is a circuit diagram of the solid-state radiographic image detector 110, in which the arrangement of a portion of the plurality of detection elements is illustrated. As illustrated in FIG. 7, the gate terminals G of the TFTs 116 on each line are commonly connected to one of the gate driving lines G1, G2, G3 . . . , which is connected to a line output terminal, corresponding to the line, of a gate driver (not shown). In addition, the drain terminals D of the TFTs 116 in each column are commonly connected to one of data lines D1, D2, D3 . . . , which is connected to one of the detection amplifiers 151 corresponding to the column. In order to read out the latent-image charges stored in each signal accumulation capacitor 115, image information is read out by activating the corresponding TFT 116 and converting the latent-image charges to a voltage signal by the current detection circuit 150.

Operations of 2nd Embodiment

The radiographic imaging system 100 as the second embodiment of the present invention is different from the conventional radiographic imaging systems in that start/stop control is made for application of a preliminary voltage to the solid-state radiographic image detector 110 and preliminary readout before application of a recording voltage for recording an electrostatic latent image in the solid-state radiographic image detector 110. Details of the operations of the second embodiment of the present invention are explained below.

Figure 8:
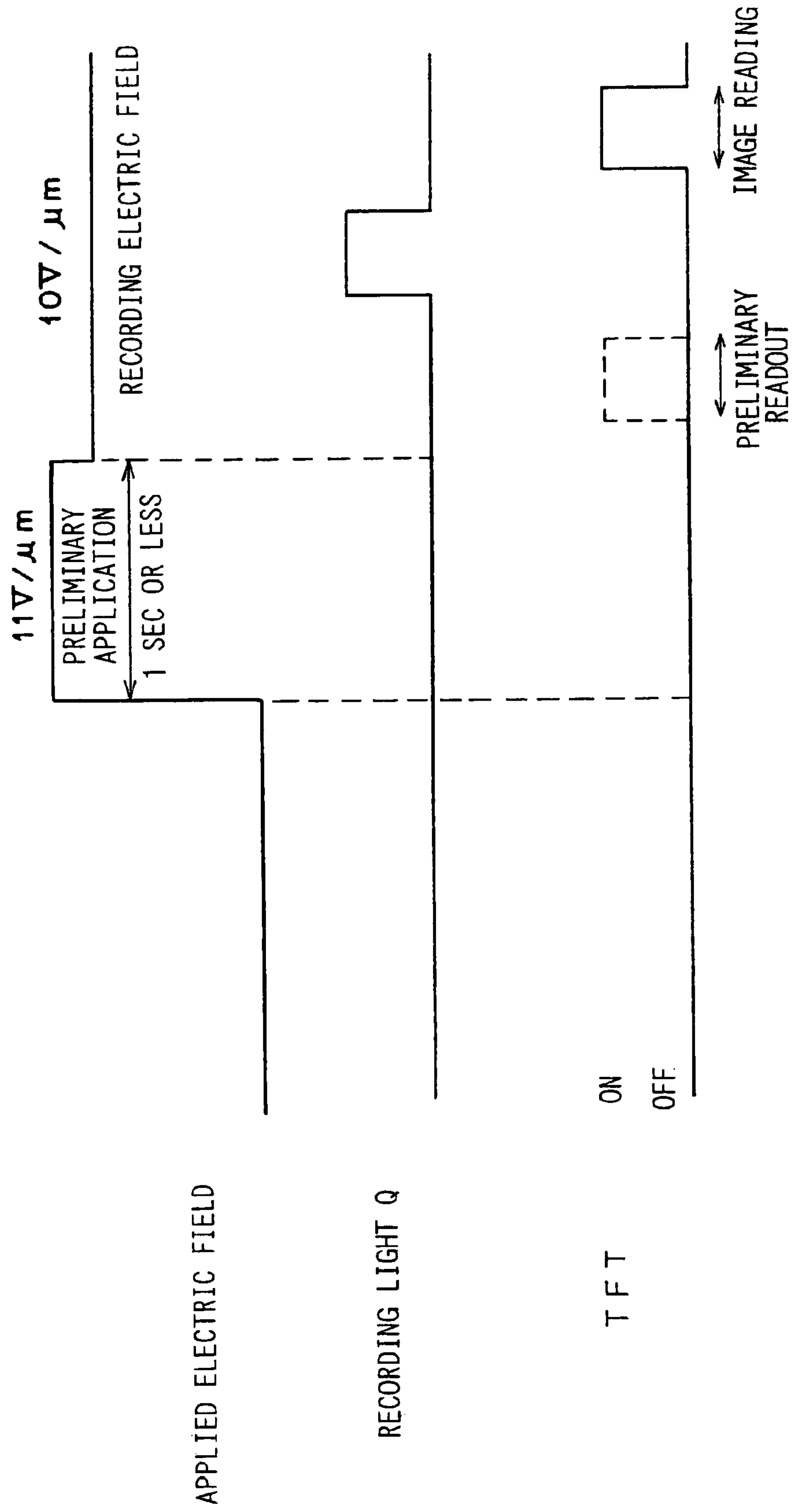
FIG. 8 is a timing diagram indicating timings of operations of the radiographic imaging system of FIG. 6.

FIG. 8 is a timing diagram indicating timings of operations of the radiographic imaging system 100 of FIG. 6. In the second embodiment, the preliminary voltage, which is higher than the recording voltage, is applied to the solid-state radiographic image detector 110 for a predetermined duration, and thereafter the electric field applied to the solid-state radiographic image detector 110 is dropped to the recording voltage, i.e., the recording voltage is applied to the solid-state radiographic image detector 110. Specifically, the operations of the radiographic imaging system 100 of FIG. 6 are performed as follows.

First, the control signal C2 is placed at the high (H) level, and the switch 142 is turned on so that the preliminary voltage, which is higher than the recording voltage and supplied from the power supply 143, is applied to the solid-state radiographic image detector 110. Thus, an electric field (preliminary electric field) having an electric potential gradient of, for example, about 11 V/$\mu$m is produced in the photoconductive layer 113. At this stage, the TFT 116 may be in either of ON and OFF state.

When the application of the preliminary voltage continues for a predetermined duration (e.g., about one second), the application of the preliminary voltage is stopped by dropping the voltage applied to the solid-state radiographic image detector 110 from the preliminary voltage to the recording voltage which produces an electric field (recording electric field) of 10 V/μm. The strengths of the electric fields of 11 and 10 V/μm in the photoconductive layer 113 can be realized by controlling the output voltage of the power supply 143 based on the voltage control signal C4.

Next, within a predetermined time (e.g., about thirty seconds or more preferably about one second) of the termination of the application of the preliminary voltage (i.e., the drop of the voltage applied to the solid-state radiographic image detector 110 to the reading voltage), the photoconductive layer 113 is exposed to the recording light Q, and an electrostatic latent image is recorded in the solid-state radiographic image detector 110 as follows.

First, the TFT 116 is turned off while applying the recording voltage to the solid-state radiographic image detector 110, and then the solid-state radiographic image detector 110 is exposed to the recording light Q for an exposure time, which is preset, in a similar manner to the first embodiment. Due to the exposure to the recording light Q, pairs of positive and negative charges are generated, where the amount of the generated pairs of positive and negative charges is proportional to the intensity (amount) of the recording light Q which enters the photoconductive layer 113 of the solid-state radiographic image detector 110. Then, the positive charges in the pairs are collected by the charge collection electrode 114 as latent-image charges, and stored in the signal accumulation capacitor 115. Thus, an electrostatic latent image is recorded in the solid-state radiographic image detector 110. On the other hand, the negative charges in the above pairs are attracted by the recording-side electrode layer 111, and stored at the boundary between the photoconductive layer 113 and the insulator 112.

Figure 9:
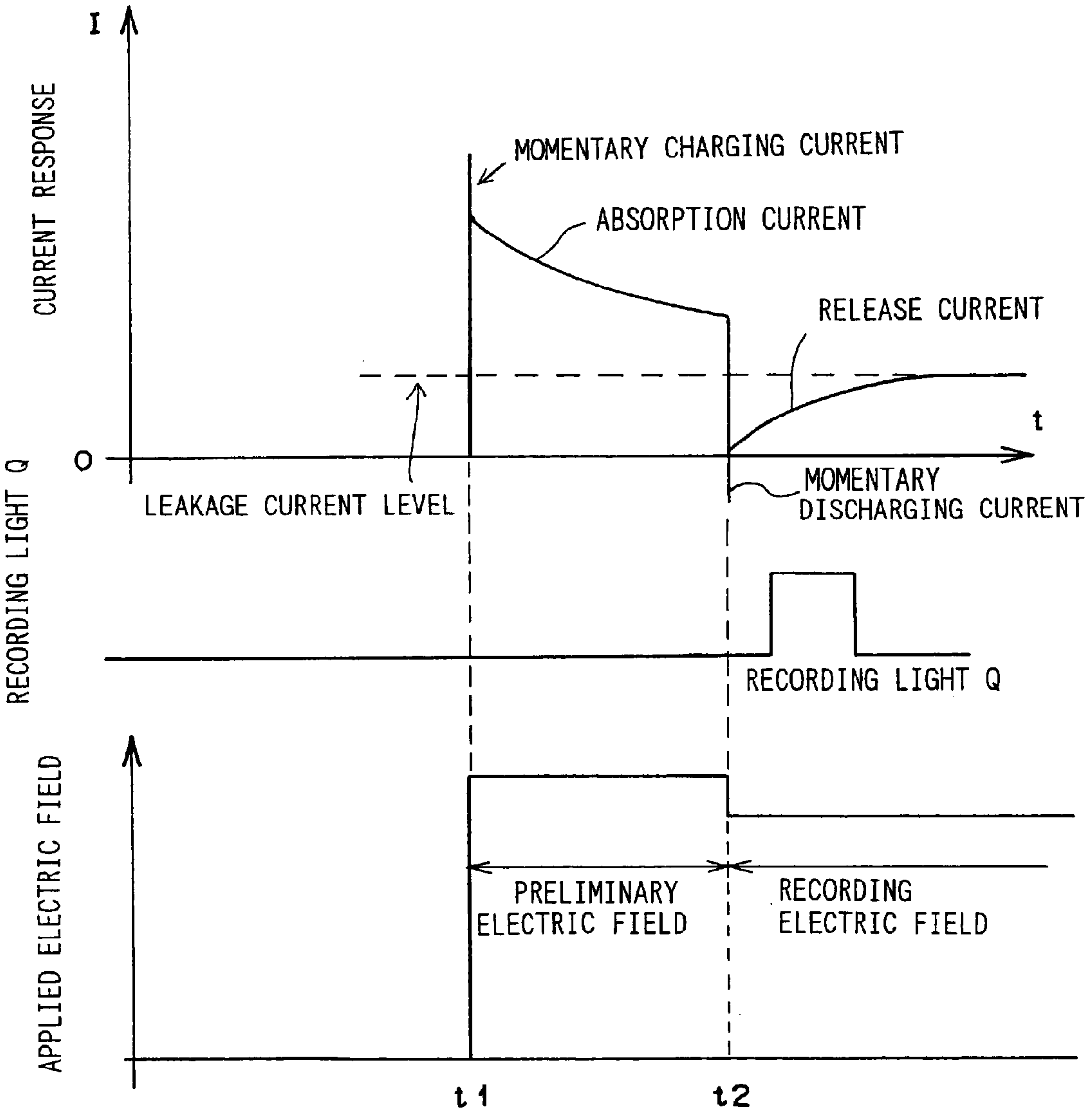
FIG. 9 is a diagram illustrating current response characteristics in a recording process in the second embodiment of the present invention.

FIG. 9 is a diagram illustrating current response characteristics in a recording process in the second embodiment of the present invention. As indicated in FIG. 9, a very large, momentary charging current flows at the beginning (time t1) of the application of the preliminary voltage. Thereafter, an absorption current flows, and gradually decreases with time toward a constant leakage current level corresponding to the preliminary voltage. However, since the strength of electric field is dropped from the preliminary electric field to the recording electric field at time t2 before the current level reaches the constant leakage current, the dark current decreases by the amount of the aforementioned momentary discharging current after the drop of the strength of electric field. Then, a release current flows, gradually increases with time, and approaches a constant leakage current level corresponding to the recording voltage. That is, within a transient interval during which the release current flows, the dark current level is lower than the leakage current level, i.e., the dark resistance is great. In particular, immediately after the drop of the strength of electric field, the dark current level becomes very low, i.e., the dark resistance becomes very great. Even during the above transient interval, the recording electric field exists in the photoconductive layer 113. Therefore, when the photoconductive layer 113 is exposed to the recording light Q during the above transient interval, pairs of charges are generated, and thereby an illuminated current component which is generated by exposure to the recording light Q flows, where the amount of the generated pairs of charges corresponds to the incident radiation dose, and the illuminated current component carries image information. Thus, the illuminated current component is superimposed on the dark current within the transient interval during which the dark current is low. In the signal accumulation capacitor 115, charges corresponding to the total current of the illuminated current component and the dark current component are accumulated. Therefore, the influence of the dark latent image can be reduced by the decrease of the dark current level.

However, in the second embodiment, the intensity of the accumulated latent image is increased by the amount of the absorption current which is generated during the application of the preliminary voltage. Therefore, it is preferable that after the application of the preliminary voltage, the TFTs 116 are momentarily turned on so that the charges accumulated in the signal accumulation capacitor 115 are read out, i.e., the preliminary readout is performed. When the preliminary readout is completed, the TFTs 116 are turned off before the latent image is recorded in the solid-state radiographic image detector 110. Alternatively, it is possible to prevent accumulation of the dark latent image during the application of the preliminary voltage by turning on the TFTs 116 during the application of the preliminary voltage.

Construction of Third Embodiment

Conventionally, radiographic-image reading systems which use a stimulable phosphor sheet as an image recording sheet and a photomultiplier as a photoelectric reading means are well known. Further, the coassigned U.S. Ser. Nos. 09/792,035 and 09/534,204 corresponding to Japanese Patent Application Nos. 2000-50201, 2000-50202, 2000-50203, 2000-50204, 2000-50205, and 11(1999)-79984 disclose radiographic-image reading systems which use a solid-state image detector instead of the photomultiplier. In the third embodiment of the present invention, the present invention is applied to a radiographic-image reading system having a construction as disclosed in the coassigned U.S. Ser. Nos. 09/792,035 and 09/534,204.

Figure 10A:
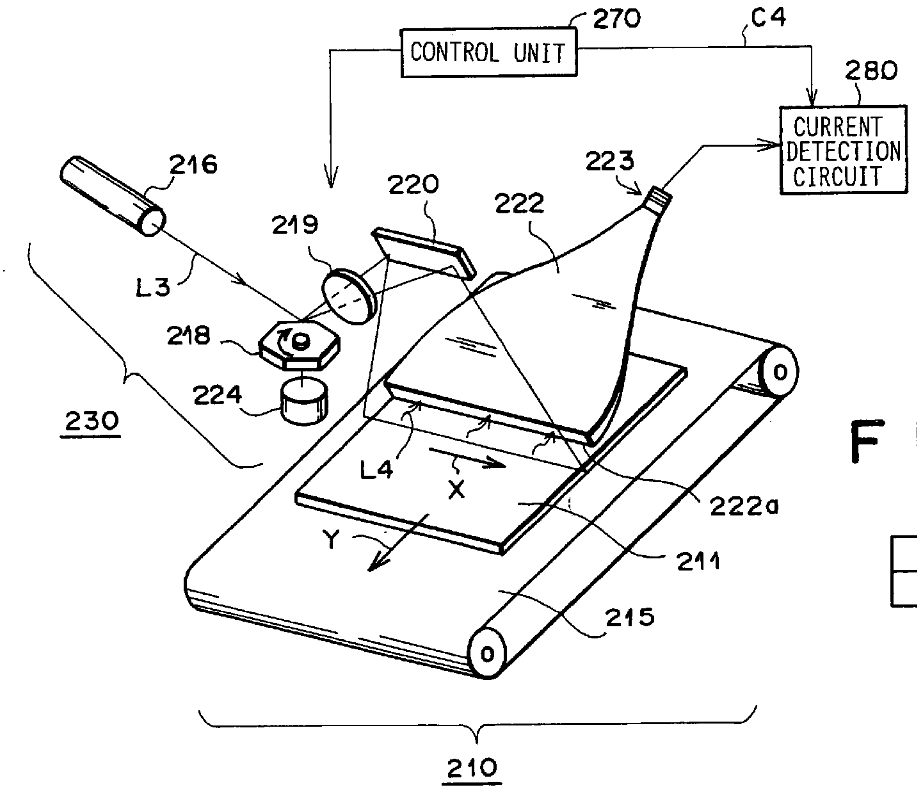
FIG. 10A is a perspective view illustrating an outline of a construction of a radiographic-image reading system as a third embodiment of the present invention.

FIG. 10A is a perspective view illustrating an outline of the construction of the radiographic-image reading system as the third embodiment of the present invention.

The radiographic-image reading system of FIG. 10A comprises a reading unit 210, an excitation-light scanning unit 230, a control unit 270, and a current detection circuit 280.

The reading unit 210 comprises a sheet conveying unit 215, an optical guide 222, and a solid-state image detector 223. A stimulable phosphor sheet 211, in which a radiographic image is recorded, is set in a predetermined position of the reading unit 210, and moved in a feeding direction (indicated by the arrow Y in FIG. 10A) by the sheet conveying unit 215, which is realized by, for example, an endless belt driven by a driving unit (not shown).

The excitation-light scanning unit 230 comprises a laser light source 216, a polygon mirror 218, a convergent lens 219, a mirror 220, a motor 224, and a driving unit (not shown). The laser light source 216 emits as excitation light a laser beam L3 in the red wavelength range. The polygon mirror 218 is driven by the motor 224 so as to rotate at high speed in the direction of the arrow indicated on the polygon mirror 218 in FIG. 10A, and reflects and deflects the laser beam L3. The convergent lens 219 is, for example, an fθ lens. After the laser beam L3 passes through the convergent lens 219, the mirror 220 changes the optical path of the laser beam L3 so that the laser beam L3 enters the stimulable phosphor sheet 211. Due to the rotation of the polygon mirror 218, the laser beam L3 scans the stimulable phosphor sheet 211 in a main scanning direction (indicated by the arrow X in FIG. 10A), which is approximately perpendicular to the feeding direction (indicated by the arrow Y in FIG. 10A). When each portion of the stimulable phosphor sheet 211 is exposed to the laser beam L3, the portion of the stimulable phosphor sheet 211 emits accelerated phosphorescence light L4, where the light quantity of the accelerated phosphorescence light corresponds to information on a radiographic image stored in the portion of the stimulable phosphor sheet 211, and the wavelength of the accelerated phosphorescence light is in the vicinity of 400 nm (in the blue wavelength range). The accelerated phosphorescence light L4 enters the optical guide 222 through an light-entrance end surface 222*a*, propagates through the optical guide 222 by repeating total reflection, exits from a light-exit end surface 222*b*, and enters the solid-state image detector 223.

Figure 10B:
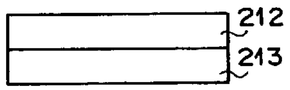
FIG. 10B is a cross-sectional view of the stimulable phosphor sheet in the radiographic-image reading system of FIG. 10A.

FIG. 10B is a cross-sectional view of the stimulable phosphor sheet 211. As illustrated in FIG. 10B, the stimulable phosphor sheet 211 is constituted by forming a stimulable phosphor layer 212 on a base 213. When the stimulable phosphor layer 212 is exposed to the excitation light, the stimulable phosphor layer 212 emits accelerated phosphorescence light L4, and the light quantity of accelerated phosphorescence light L4 corresponds to energy stored in the stimulable phosphor layer 212. The stimulable phosphor layer 212 may be made of any material which emits blue accelerated phosphorescence light having a wavelength of 500 nm or less (preferably in the range of 400 to 450 nm) when excited with red excitation light having a wavelength of 600 nm or more. For example, the well-known stimulable phosphor sheet can be utilized. Although not shown, further layers such as a protection layer and a sensitizing layer may be provided in the stimulable phosphor sheet 211.

Figure 10C:
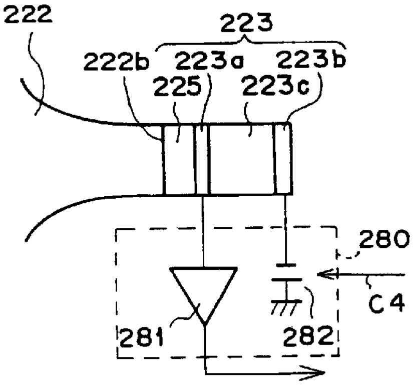
FIG. 10C is a diagram illustrating a cross section of a portion of the solid-state image detector and the current detection circuit in the radiographic-image reading system of FIG. 10A.

FIG. 10C is a diagram illustrating a cross section of a portion of the solid-state image detector 223 and the current detection circuit 280 used in the radiographic-image reading system of FIG. 10A.

The solid-state image detector 223 of FIG. 10C comprises two planar electrodes 223*a* and 223*b*, a photoconductive layer 223*c*, where the photoconductive layer 223*c* is sandwiched between the planar electrodes 223*a* and 223*b*, and exhibits conductivity when exposed to the accelerated phosphorescence light L4. The solid-state image detector 223 functions as a zero-dimensional sensor which detects the accelerated phosphorescence light L4 which enters the solid-state image detector 223 through the optical guide 222 and an excitation-light cut filter 225.

The planar electrode 223*a* uses a well known transparent conductive film such as the ITO (Indium Tin Oxide). film in order to make the planar electrode 223*a* transparent to the accelerated phosphorescence light L4 which is incident on the planar electrode 223*a* through the excitation-light cut filter 225. On the other hand, since the planar electrode 223*b* is not required to be transparent, the planar electrode 223*b* is made of aluminum.

In this example, the photoconductive layer 223*c* is made of a photoconductive material containing a-Se as a main component in consideration of combination with a stimulable phosphor layer 212 which emits accelerated phosphorescence light in the blue wavelength range of 500 nm or less (e.g., near 400 nm).

The size (detection area) of the (a-Se) photoconductive layer 223*c* is arranged to be sufficiently smaller than the size of the stimulable phosphor sheet 211. For example, the stimulable phosphor sheet 211 has a size of 430 mm×430 mm (17 inch square). In this case, the (a-Se) photoconductive layer 223*c* can be arranged to have a size of 50 mm square or smaller. When the size of the photoconductive layer 223*c* is reduced as above, it is possible to prevent generation of an excessive dark current and reduce load capacity. Therefore, the solid-state image detector 223 can achieve a higher S/N ratio than the detection panel in which a stimulable phosphor layer is opposed to a photoconductive layer having an approximately the same size of the photoconductive layer.

In order to sufficiently absorb the accelerated phosphorescence light L4, cause avalanche amplification, and increase obtained signal amplitude, it is preferable that the thickness of the photoconductive layer 223*c* is 1 micrometer or more. In addition, although a thick photoconductive layer is preferable for reduction of distributed capacitance and suppression of fixed noise, the power supply voltage is increased when the thickness of the photoconductive layer 223*c* is too great. Therefore, in order to increase the ratio of the avalanche amplification and the fixed noise in consideration of the power supply voltage, the thickness of the photoconductive layer 223*c* is arranged, for example, in the range from 1 micrometer to 100 micrometers, and more preferably in the range from 10 micrometer to 50 micrometers.

As described before, the excitation-light cut filter 225 is arranged between the light-exit end surface 222*b* of the optical guide 222 and the planar electrode 223*a* of the solid-state image detector 223, which is located on the light-entrance side of the solid-state image detector 223. When the red laser beam L3, which does not carry the information on the radiographic image, enters the photoconductive layer 223*c* through the optical guide 222, an offset current corresponding to a small amount of charges generated by the laser beam L3 flows since the photoconductive layer 223*c* has a small degree of sensitivity to the red laser beam L3. However, the excitation-light cut filter 225 absorbs red light having a wavelength of 600 nm or greater. Therefore, when the excitation-light cut filter 225 is arranged as above, the excitation-light cut filter 225 absorbs the red laser beam L3, and only the blue accelerated phosphorescence light L4 enters the photoconductive layer 223*c*. Thus, the above offset current can be suppressed. In addition, since the sensitivity of the photoconductive layer 223*c* to the red light having a wavelength of 600 nm or greater is low, it is possible to use a thinner excitation-light cut filter than those used with photomultipliers in the conventional solid-state image detectors.

Figure 11A:
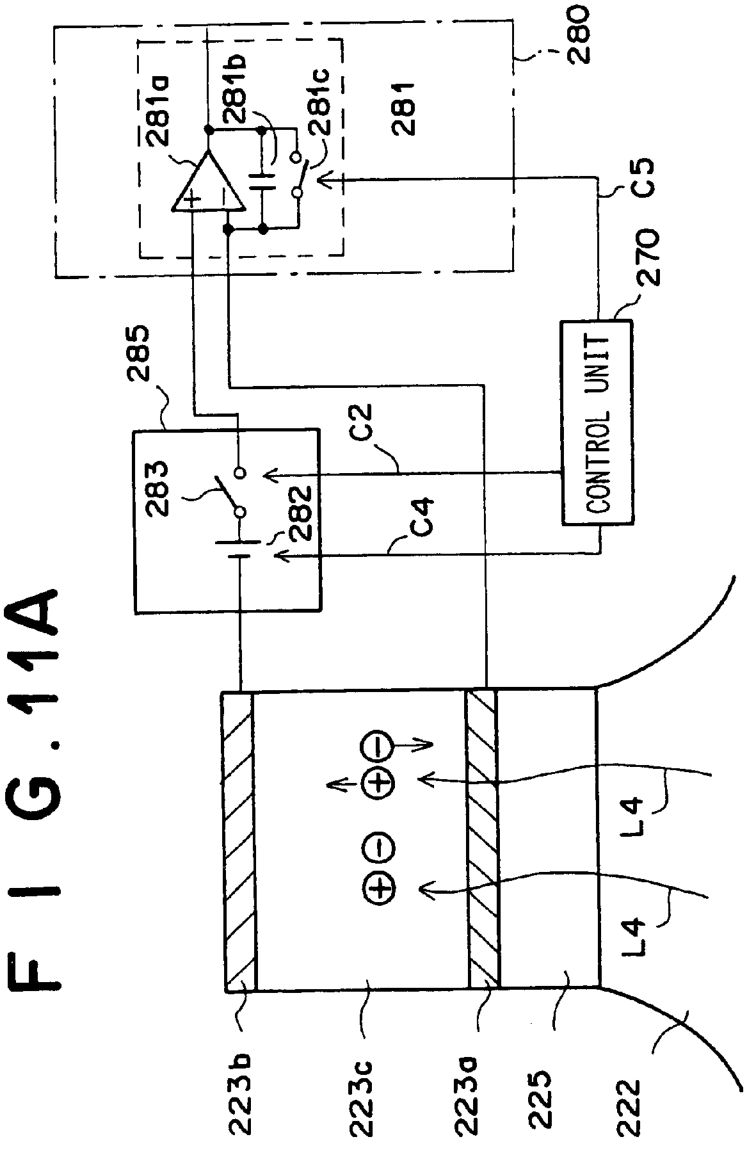
FIG. 11A is a diagram illustrating a cross section of the solid-state image detector and constructions of circuits provided for reading out charges from the solid-state image detector.
Figure 11B:
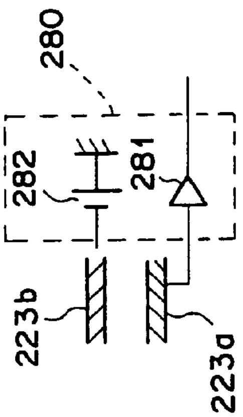
FIG. 11B is a simplified diagram illustrating the functions of the constructions illustrated in FIG. 11A.

FIG. 11A is a diagram illustrating a cross section of the solid-state image detector 223 and constructions of circuits provided for reading out charges from the solid-state image detector 223, and FIG. 11B is a simplified diagram illustrating the functions of the constructions illustrated in FIG. 11A. As illustrated in FIG. 11A, the current detection circuit 280 and a voltage application unit 285 are connected to the solid-state image detector 223, and controlled by the control unit 270.

The current detection circuit 280 includes a detection amplifier 281, which comprises an operational amplifier 281*a*, an integrating capacitor 281*b*, and a switch 281*c*. The planar electrode 223*a* is connected to an inverted input terminal (−) of the operational amplifier 281*a*.

The voltage application unit 285 is provided for applying a predetermined voltage between the planar electrodes 223*a* and 223*b* of the solid-state image detector 223, and producing an electric field in the photoconductive layer 223*c*. The voltage application unit 285 comprises a power supply 282 and a switch 283. The positive terminal of the power supply 282 is connected to the non-inverted input terminal (+) of the operational amplifier 281a through the switch 283. The power supply 282 is a voltage-variable type power supply which can vary an output voltage according to a voltage control signal C4 supplied from the control unit 270. In addition, the magnitude of a reading voltage supplied from the power supply 282 is set so that the electric potential gradient (electric field) in the photoconductive layer 223*c* becomes, for example, about 10 V/μm. The avalanche amplification occurs when the reading voltage is further increased.

When the photoconductive layer 223*c* of the solid-state image detector 223 is exposed to the accelerated phosphorescence light L4, pairs of positive and negative charges corresponding to the light quantity of the accelerated phosphorescence light L4 are generated in the photoconductive layer 223*c*. When the reading voltage is applied to the solid-state image detector 223, due to the electric field in the photoconductive layer 223*c*, the negative charges in the above pairs move to the planar electrode 223*a*, and the positive charges in the above pairs move to the planar electrode 223*b*.

The detection amplifier 281 is connected between the planar electrodes 223*a* and 223*b* of the solid-state image detector 223, and detects currents corresponding to the above movement of charges. Thus, the detection amplifier 281 can acquire an image signal corresponding to energy accumulated in the stimulable phosphor layer 212. In other words, the information on a radiographic image can be read out in the form of an image signal.

Operation of 3rd Embodiment

Figure 12:
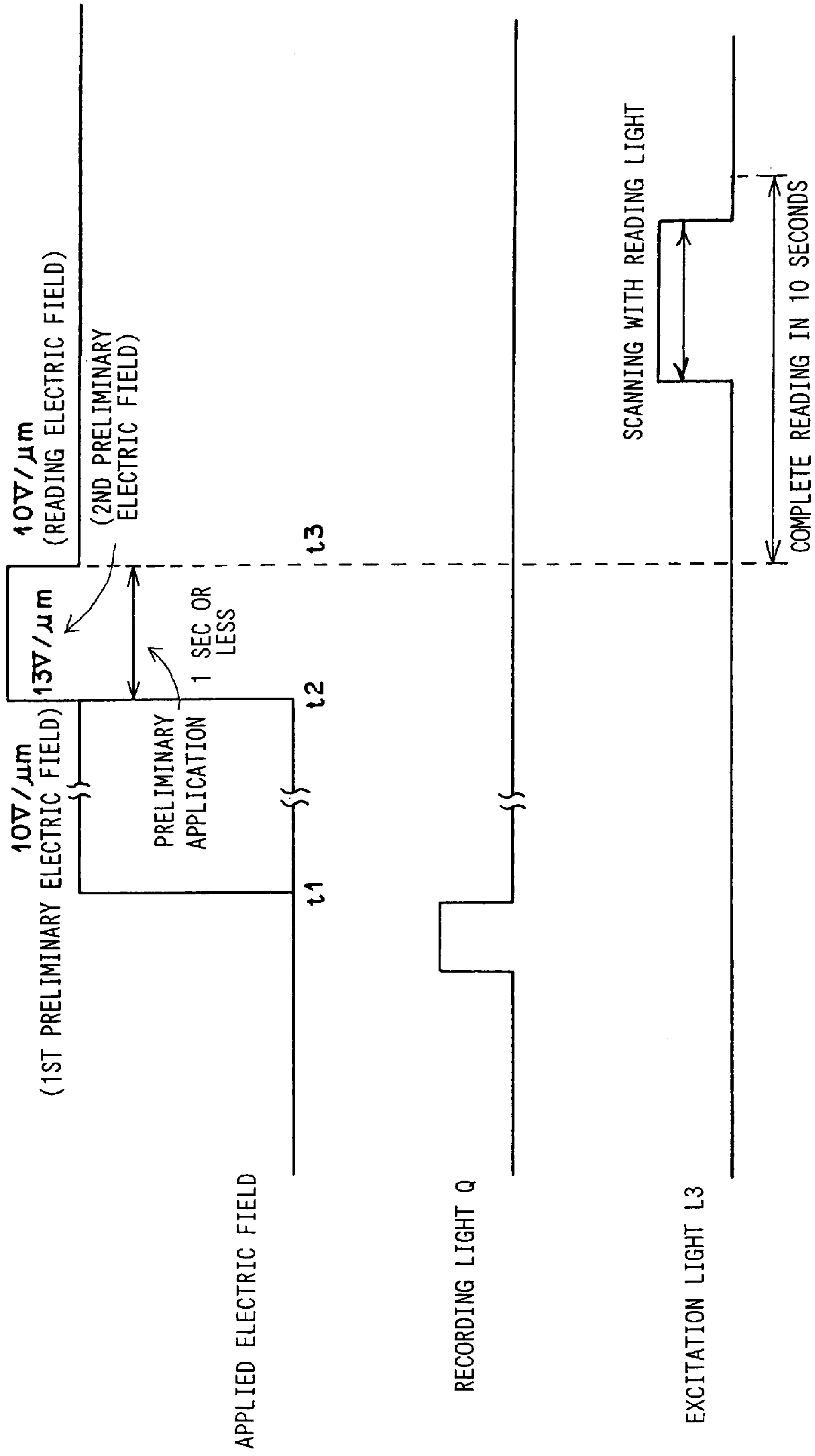
FIG. 12 is a timing diagram indicating timings of operations of the radiographic-image reading system as the third embodiment of the present invention.

FIG. 12 is a timing diagram indicating timings of operations of the radiographic-image reading system as the third embodiment of the present invention. When information on a radiographic image is read out from the stimulable phosphor sheet 211 in which the information on the radiographic image is recorded in advance, first, a first preliminary voltage having the same height as a reading voltage is applied to the solid-state image detector 223 in order to realize a stable, high resistance state, and then a second preliminary voltage which is higher than the reading voltage is applied for a predetermined time. Thereafter, the voltage applied to the solid-state image detector 223 is dropped to the reading voltage.

Specifically, first, the control signal C2 is placed at the high (H) level, and the switch 283 is turned on. Thus, the first preliminary voltage having the same height as a reading voltage is applied between the planar electrodes 223*a* and 223*b* of the solid-state image detector 223 through the imaginary short circuit of the operational amplifier 281*a* so that the electric potential gradient in the photoconductive layer 223*c* becomes about 10 V/μm. After the reading voltage is stabilized, a preliminary voltage which is higher than the reading voltage is applied between the planar electrodes 223*a* and 223*b* of the solid-state image detector 223 so that the electric potential gradient in the photoconductive layer 223*c* becomes, for example, about 13 V/μm. After the application of the preliminary voltage continues for a predetermined duration, the voltage applied to the solid-state image detector 223 is dropped to the reading voltage. The predetermined duration is about thirty seconds or less, and for example, about one second.

Within a predetermined time (e.g., about thirty seconds, or more preferably about ten seconds) of the above voltage drop to the reading voltage, the entire surface of the stimulable phosphor sheet 211 is scanned with the laser beam (excitation light) L3 while maintaining the electric field in the photoconductive layer 223*c* due to the application of the reading voltage to the solid-state image detector 223, and the intensities of the accelerated phosphorescence light L4 emitted from the scanned portions of the stimulable phosphor sheet 211 are detected by the solid-state image detector 223. Thus, the information on the radiographic image is obtained as an image signal, which is output from the current detection circuit 280.

Figure 13A:
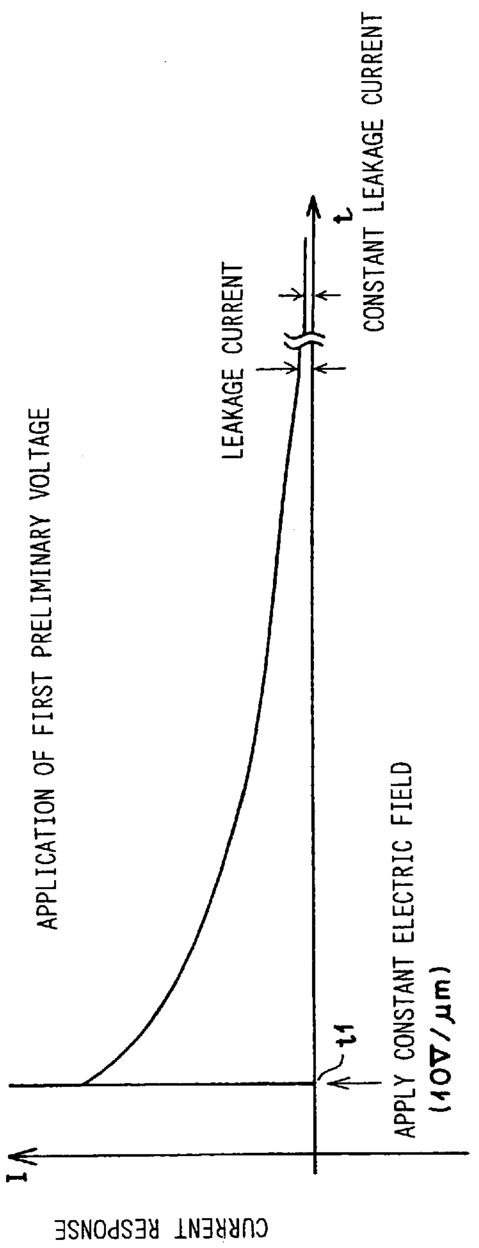
FIGS. 13A and 13B are diagrams illustrating current response characteristics in a reading process in the third embodiment of the present invention.
Figure 13B:
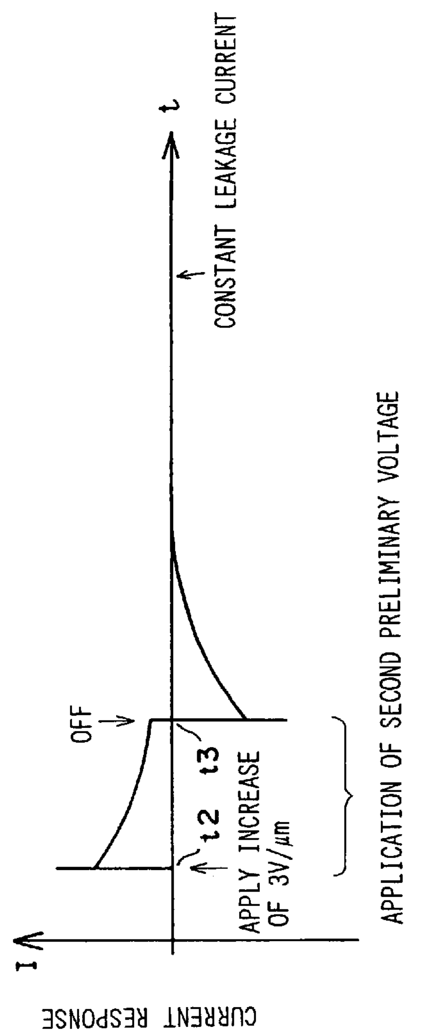

FIGS. 13A and 13B are diagrams illustrating current response characteristics in a reading process in the third embodiment of the present invention. FIG. 13A is a diagram illustrating a current variation in response to application of the first preliminary voltage before the second preliminary voltage is applied, and FIG. 13B is a diagram illustrating a current variation in response to the second preliminary voltage, which is applied after the current in FIG. 13A reaches a constant leakage current (i.e., the current is stabilized).

At time t1, the first preliminary voltage at the same level as the reading voltage is applied to the solid-state image detector 223 as indicated in FIG. 12. In response to the application of the first preliminary voltage, a very large, first momentary charging current flows at the beginning (time t1) of the application of the first preliminary voltage, as indicated in FIG. 13A. Thereafter, a first absorption current flows, and gradually decreases with time to a first constant leakage current level corresponding to the level of the first preliminary voltage (i.e., corresponding to the reading voltage). After the current is stabilized, at time t2, the second preliminary voltage is applied, i.e., the voltage applied to the solid-state image detector 223 is raised to the second preliminary voltage, as indicated in FIG. 12. In response to the voltage rise to the second preliminary voltage, a second momentary charging current flows at the beginning (time t2) of the application of the second preliminary voltage, as indicated in FIG. 13B. Thereafter, a second absorption current flows, and gradually decreases with time toward a second constant leakage current level corresponding to the level of the second preliminary voltage. Next, before the current level reaches the second constant leakage current level, at time t3, the reading voltage is applied, i.e., the voltage applied to the solid-state image detector 223 is dropped to the reading voltage, as indicated in FIG. 12. In response to the voltage drop to the reading voltage, the dark current decreases by the amount of the above second momentary charging current. Then, a release current flows, gradually increases with time, and approaches the first constant leakage current level corresponding to the recording voltage. Thus, the dark current level is lower than the (first) leakage current level within the transient interval during which the release current flows. In particular, immediately after the voltage drop to the reading voltage, the dark current level is very low. Therefore, when the radiographic image recorded in the stimulable phosphor sheet 211 is read during the above transient interval, dark current noise can be reduced.

In addition, since the second preliminary voltage, which is higher than the reading voltage, is momentarily applied after the dark current generated in response to the application of the first preliminary voltage is stabilized (i.e., after the solid-state image detector 223 enters a high resistance state). Therefore, the duration in which the dark current level is low becomes long, and the effect of the present invention can be achieved even when the difference between the preliminary voltage and the reading voltage is small (e.g., 3 V/μm in this example). Thus, variations in the dark current during the transient response to the application of the preliminary voltages can be reduced. That is, the above manner of the electric field application in the third embodiment is preferable from the viewpoint of stability.

Although the dark current momentarily increases at the beginning of the application of the preliminary voltage, the increased dark current is not accumulated in the solid-state image detector 223 as a dark latent image, and is instead stored in the integrating capacitor 281*b* to form a noise source. Therefore, it is preferable to read out the charges accumulated in the integrating capacitor 281*b* before reading image information by exposure to the reading (excitation) light. The charges accumulated in the integrating capacitor 281*b* can be read out by turning on the switch 281*c* by using the control signal C5.

In the third embodiment, since the second preliminary voltage, which is higher than the reading voltage, is momentarily applied after the dark current generated in response to the application of the first preliminary voltage is stabilized. (i.e., after the solid-state image detector 223 enters a high resistance state). However, alternatively, the application of the first preliminary voltage can be dispensed with.

Variations and Other Matters

Although the above descriptions are provided for the preferred embodiments of the present invention, the scope of the present invention is not limited to such embodiments. Various modifications and changes are possible within the scope of the invention.

(a) Although the solid-state image detector used in the first embodiment is a direct-conversion, optical-readout type, any other type of solid-state image detectors which comprise at least one photoconductive layer sandwiched between electrodes can be used as the solid-state image detector in the radiographic imaging system as the first embodiment of the present invention. For example, the following solid-state image detectors can be used:

(i) a solid-state image detector comprising a recording-side electrode layer, a recording-side photoconductive layer, a trap layer (as a charge storing portion), a reading-side photoconductive layer, and a reading-side electrode layer, as disclosed in, for example, U.S. Pat. No. 4,435,468;

(ii) a solid-state image detector comprising a recording-side electrode layer, a recording-side photoconductive layer, a photoconductive layer used for recording and reading, a reading-side electrode layer, and a charge storing portion formed at the boundary between the photoconductive layer and the reading-side electrode layer, as disclosed in, for example, Medical Physics, Vol. 16, No.1, January/February 1989, pp.105–109; and (iii) a solid-state image detector comprising a recording-side electrode layer, an insulator layer, a photoconductive layer used for recording and reading, a reading-side electrode layer, and a charge storing portion formed at the boundary between the insulator layer and the photoconductive layer.

Even when one of the above solid-state image detectors (i) to (iii) is used in the radiographic imaging system as the first embodiment of the present invention, the radiographic imaging system can perform the aforementioned first and second modes of operation.

(b) Although the solid-state image detector comprising as a main member an amorphous photoconductor is used as a photoelectric conversion means (for detecting the accelerated phosphorescence light emitted from the stimulable phosphor sheet) in the third embodiment, another type of solid-state image detector can be used in the third embodiment. For example, the long-length, zero-dimensional detectors or the line sensors disclosed in the coassigned U.S. Ser. Nos. 09/792,035 and 09/534,204 corresponding to Japanese Patent Application Nos. 2000-50201, 2000-50202, 2000-50203, 2000-50204, 2000-50205, and 11(1999)-79984 can be used instead of the solid-state image detector in the third embodiment.

What is claimed is:

1. A method for recording image information in an image recording medium including a photoconductor which is made of an amorphous material, and generates latent-image charges when the photoconductor is exposed to an electromagnetic wave during application of a first electric field to the photoconductor, and a charge storing portion which stores the latent-image charges so as to form a latent image; said method comprising the steps of:

(a) applying to said photoconductor a second electric field stronger than said first electric field;

(b) stopping application of said second electric field to said photoconductor; and (c) recording in the image recording medium the image information carried by the electromagnetic wave by exposing said photoconductor to the electromagnetic wave while applying said first electric field to said photoconductor, so that the latent-image charges generated in the photoconductor corresponding to the image information are stored in the charge storing portion.

2. A method according to claim 1, wherein said step (c) is performed within about thirty seconds of the operation in said step (b).

3. A method according to claim 1, further comprising the step of (d) applying a third electric field to said photoconductor before performing said step (a), where said third electric field has an identical strength to said first electric field.

4. A method according to claim 1, further comprising the step of (e) reading out charges corresponding to a dark latent image from the image recording medium before performing said step (c).

5. An apparatus for recording image information carried by an electromagnetic wave as a latent image in an image recording medium including a photoconductor which is made of an amorphous material, and generates latent-image charges when the photoconductor is exposed to the electromagnetic wave during application of a first electric field to the photoconductor, and a charge storing portion which stores the latent-image charges so as to form the latent image; said apparatus comprising:

an electric-field applying unit which applies an electric field to said photoconductor; and a control unit which controls said electric-field applying unit so as to first apply a second electric field to said photoconductor for a certain duration, and thereafter apply said first electric field to the photoconductor for recording the image information, where said second electric field is stronger than said first electric field.

6. An apparatus according to claim 5, wherein said control unit controls said electric-field applying unit so as to apply a third electric field to said photoconductor before application of the second electric field to said photoconductor, where said third electric field has an identical strength to said first electric field.

7. An apparatus according to claim 5, further comprising a reading unit which reads said image information by detecting charges corresponding to said latent-image charges and being stored in the charge storing portion, and said control unit controls said electric-field applying unit and said reading unit so that the reading unit reads out charges corresponding to a dark latent image from said image recording medium, before recording the image information.

8. A method comprising the steps of:

(a) applying a first electric field to a photoconductor made of an amorphous material;

(b) stopping application of said first electric field to said photoconductor; and (c) reading image information carried by an electromagnetic wave by exposing said photoconductor to the electromagnetic wave while applying a second electric field to said photoconductor, and detecting charges which are generated in the photoconductor when the photoconductor is exposed to the electromagnetic wave during application of the second electric field to the photoconductor, where said first electric field is stronger than said second electric field.

9. A method according to claim 8, wherein said step (c) is performed within about thirty seconds of the operation in said step (b).

10. A method according to claim 8, further comprising the step of (d) applying a third electric field to said photoconductor before performing said step (a), where said third electric field has an identical strength to said second electric field.

11. A method according to claim 8, further comprising the step of (e) reading out a portion of a dark current increased by application of the first electric field, before performing said step (c).

12. An apparatus comprising:

a photoconductor which is made of an amorphous material, and generates charges when exposed to an electromagnetic wave during application of a first electric field to the photoconductor;

an electric-field applying unit which applies an electric field to said photoconductor;

a reading unit which reads image information carried by the electromagnetic wave by detecting the charges generated by the photoconductor during the application of the first electric field to the photoconductor; and a control unit which controls said electric-field applying unit so as to first apply a second electric field to said photoconductor for a certain duration, and thereafter apply said first electric field to the photoconductor for reading the image information, where said second electric field is stronger than said first electric field.

13. An apparatus according to claim 12, wherein said control unit controls said control unit and said reading unit so that said reading unit reads the image information within about thirty seconds of completion of the application of the second electric field to said photoconductor.

14. An apparatus according to claim 12, wherein said control unit controls said control unit so as to apply a third electric field to said photoconductor before application of the second electric field to said photoconductor, where said third electric field has an identical strength to said first electric field.

15. An apparatus according to claim 12, wherein said control unit controls said control unit and said reading unit so that said reading unit reads out a portion of a dark current increased by application of the second electric field, before detecting the charges generated by the photoconductor during the application of the first electric field to the photoconductor.

* * * * *